US010013845B2

(12) United States Patent
Froy, Jr. et al.

(10) Patent No.: US 10,013,845 B2
(45) Date of Patent: Jul. 3, 2018

(54) WAGERING GAMING APPARATUS WITH MULTI-PLAYER DISPLAY AND RELATED TECHNIQUES

(71) Applicant: IGT Canada Solutions ULC, Moncton (CA)

(72) Inventors: David V. Froy, Jr., Lakeville-Westmorland (CA); Stefan Keilwert, St. Josef (AT)

(73) Assignee: IGT CANADA SOLUTIONS ULC, Moncton (CA)

( * ) Notice: Subject to any disclaimer, the term of this patent is extended or adjusted under 35 U.S.C. 154(b) by 236 days.

(21) Appl. No.: 14/966,767

(22) Filed: Dec. 11, 2015

(65) Prior Publication Data

US 2016/0171814 A1 Jun. 16, 2016

Related U.S. Application Data

(60) Continuation-in-part of application No. 14/509,174, filed on Oct. 8, 2014, which is a division of application No. 14/493,815, filed on Sep. 23, 2014.

(51) Int. Cl.
*G06F 17/00* (2006.01)
*G07F 17/32* (2006.01)

(52) U.S. Cl.
CPC ...... *G07F 17/3211* (2013.01); *G07F 17/3209* (2013.01); *G07F 17/3223* (2013.01); *G07F 17/3241* (2013.01); *G07F 17/3276* (2013.01)

(58) Field of Classification Search
None
See application file for complete search history.

(56) References Cited

U.S. PATENT DOCUMENTS

| | | | | |
|---|---|---|---|---|
| 5,608,528 | A | 3/1997 | Ogawa | |
| 7,841,944 | B2 * | 11/2010 | Wells | G07F 17/3211 345/173 |
| 8,012,010 | B2 | 9/2011 | Wilson et al. | |
| 8,348,746 | B2 | 1/2013 | Wilson et al. | |
| 8,360,847 | B2 | 1/2013 | Williams et al. | |
| 8,384,710 | B2 | 2/2013 | Schlottmann et al. | |

(Continued)

OTHER PUBLICATIONS

U.S. Appl. No. 14/181,533, filed Feb. 14, 2014, Keilwert et al.

(Continued)

*Primary Examiner* — Ronald Laneau
(74) *Attorney, Agent, or Firm* — Sage Patent Group

(57) ABSTRACT

A wagering gaming apparatus is provided, the display being configured to make a first set of pixels spanning substantially the full area of the display visible in a first viewing zone occupied by a first player and not in a second viewing zone occupied by a second player, and to make a second set of pixels spanning substantially the full area of the display visible in the second viewing zone and not in the first viewing zone. Executing a multi-player wagering game via the wagering gaming apparatus may include displaying via the first set of pixels a first-player view of the multi-player wagering game visible to the first player and not to the second player, and displaying via the second set of pixels a second-player view of the multi-player wagering game, different from the first-player view, and visible to the second player and not to the first player.

19 Claims, 15 Drawing Sheets

(56) References Cited

U.S. PATENT DOCUMENTS

| | | | | |
|---|---|---|---|---|
| 8,784,206 | B1 * | 7/2014 | Gronkowski | G07F 17/3206 463/32 |
| 9,728,033 | B2 * | 8/2017 | Kelly | G07F 17/3213 |
| 2002/0113791 | A1 | 8/2002 | Li et al. | |
| 2008/0113747 | A1 | 5/2008 | Williams et al. | |
| 2008/0188304 | A1 | 8/2008 | Escalera et al. | |
| 2009/0251460 | A1 | 10/2009 | Dunnigan | |
| 2011/0175903 | A1 | 7/2011 | Munro et al. | |
| 2012/0013651 | A1 | 1/2012 | Trayner et al. | |
| 2012/0069015 | A1 | 3/2012 | Han | |
| 2012/0094737 | A1 | 4/2012 | Barclay | |
| 2013/0267317 | A1 | 10/2013 | Aoki et al. | |
| 2013/0303284 | A1 | 11/2013 | Aponte et al. | |
| 2014/0066178 | A1 | 3/2014 | Kelly et al. | |
| 2014/0232837 | A1 * | 8/2014 | Kim | H04N 13/0409 348/59 |

OTHER PUBLICATIONS

U.S. Appl. No. 15/133,069, filed Apr. 19, 2016, Keilwert et al.
U.S. Appl. No. 14/493,815, filed Sep. 23, 2014, Keilwert et al.
U.S. Appl. No. 14/509,174, filed Oct. 8, 2014, Keilwert et al.
U.S. Appl. No. 14/746,621, filed Jun. 22, 2015, Keilwert et al.
U.S. Appl. No. 14/821,678, filed Aug. 7, 2015, Keilwert et al.
U.S. Appl. No. 14/949,599, filed Nov. 23, 2015, Angermayer et al.
International Search Report and Written Opinion dated Nov. 3, 2015 for International Application No. PCT/CA2015/050635.
Birkhead, Tianma NLT America Announces New 3D Display System Utilizing Unique 3D Eye-Tracking System "TR3i-2". Press Release. Available at: http://www.prweb.com/releases/2014/06/prweb11902816.htm Jun. 2, 2014.
Dimenco 23in 3D Monitor, Installation. Jul. 2012;39.
Dimenco Lenticular Lens Technology, available at: http://www.dimenco.eu/our-technology/lens-technology/ last accessed Oct. 3, 2014.
Dodgson, Autostereoscopic 3D Displays. IEEE Computer. Aug. 2005;31-36.

* cited by examiner

900A

900B

900C

WAGERING GAMING APPARATUS WITH MULTI-PLAYER DISPLAY AND RELATED TECHNIQUES

RELATED APPLICATIONS

This Application claims the benefit under 35 U.S.C. § 120 as a continuation-in-part of U.S. application Ser. No. 14/509,174, titled "THREE-DIMENSIONAL DISPLAYS AND RELATED TECHNIQUES" and filed on Oct. 8, 2014, which application claims the benefit under 35 U.S.C. § 120 as a divisional of U.S. application Ser. No. 14/493,815, titled "THREE-DIMENSIONAL DISPLAYS AND RELATED TECHNIQUES" and filed on Sep. 23, 2014. Each of the foregoing applications is hereby incorporated herein by reference in its entirety.

BACKGROUND

Interest in electronic and computerized implementations of casino gaming machines has increased in recent years. For example, slot machines historically were mechanical devices ("steppers") with physical reels that were spun by pulling a lever on the side of the machine. Today, however, mechanical reels in slot machines are typically controlled electronically. The reels can be spun by pushing a button that activates the electronic control, although some machines may retain the traditional lever for entertainment value. In newer video slot machines, the physical reels are replaced by virtual reels whose symbols are displayed on a video screen, controlled by one or more computer processors. These video slot machines typically afford the game designer and operator greater flexibility in customizing the presentation of the game for the operator or the player.

Three-dimensional displays facilitate three-dimensional visualization of a displayed environment by providing visual information that may be used to understand the three-dimensional attributes of the environment, including some visual information not provided by a conventional, two-dimensional image of the environment. For example, a 2D image of an environment does not permit a viewer to see different views of the environment from each eye ("stereo parallax") or to see different views of the environment from different viewpoints ("movement parallax"), and therefor hampers a viewer's ability to perceive the environment three-dimensionally. By contrast, a 3D image may provide stereo parallax, such that the viewer's left eye may see a view of the displayed environment from a first viewpoint, and the viewer's right eye may see a view of the displayed environment from a second viewpoint. Some 3D images may provide movement parallax, such that the viewer's eyes may see the displayed environment from different viewpoints as the viewer's head and/or eyes move in relation to the 3D image or in relation to some other point of reference.

Different types of 3D display technology are known, including stereoscopic and true 3D displays. Stereoscopic displays present different 2D views of a displayed environment to the viewer's left and right eyes, thereby providing the viewer with stereo parallax information about the environment. Some stereoscopic displays require the viewer to use eyewear (e.g., shutter glasses, polarization glasses, etc.) adapted to present one view of the displayed environment to the viewer's left eye and another view of the displayed environment to the viewer's right eye. By contrast, autostereoscopic displays present different views of an environment to the viewer's left and right eyes without requiring the viewer to use eyewear. For example, an autostereoscopic display may use a parallax barrier or a lenticular lens to divide the display's pixels into a first set of pixels visible to the viewer's left eye and a second set of pixels visible to the viewer's right eye, with the first set of pixels displaying a view of an environment from a first viewpoint, and the second set of pixels displaying a view of the environment from a second viewpoint. Some autostereoscopic displays use head-tracking and/or eye-tracking to locate the viewer's head and/or eyes and to adjust the display so that the views of the environment are continually directed to the viewer's eyes even as the viewer's head moves. An overview of autostereoscopic display technology is given by N. A. Dodgson in Autostereoscopic 3D Displays, IEEE Computer (August 2005), pp. 31-36.

In contrast to stereoscopic displays, which use 2D images to generate stereo parallax, true 3D displays actually display an image in three full dimensions. Examples of true 3D display technology include holographic displays, volumetric displays, integral imaging arrays, and compressive light field displays.

SUMMARY

One type of embodiment is directed to a wagering gaming apparatus comprising: a display comprising an array of pixels defining a full area of the display, the display being configured to make a first set of pixels spanning substantially the full area of the display visible in a first viewing zone occupied by a first player and not in a second viewing zone occupied by a second player, and to make a second set of pixels spanning substantially the full area of the display visible in the second viewing zone and not in the first viewing zone; at least one processor; and at least one processor-readable storage medium storing processor-executable instructions that, when executed by the at least one processor, cause the at least one processor to execute a multi-player wagering game played by the first and second players on the wagering gaming apparatus, wherein executing the multi-player wagering game comprises displaying via the first set of pixels a first-player view of the multi-player wagering game visible to the first player in the first viewing zone and not to the second player in the second viewing zone, and displaying via the second set of pixels a second-player view of the multi-player wagering game, different from the first-player view, and visible to the second player in the second viewing zone and not to the first player in the first viewing zone.

Another type of embodiment is directed to a method of providing multi-player wagering game play on a wagering gaming apparatus having a display comprising an array of pixels defining a full area of the display, the display being configured to make a first set of pixels spanning substantially the full area of the display visible in a first viewing zone occupied by a first player and not in a second viewing zone occupied by a second player, and to make a second set of pixels spanning substantially the full area of the display visible in the second viewing zone and not in the first viewing zone, the method comprising: engaging the first player and the second player in playing a multi-player wagering game on the wagering gaming apparatus; displaying via the first set of pixels a first-player view of the multi-player wagering game visible to the first player in the first viewing zone and not to the second player in the second viewing zone; and displaying via the second set of pixels a second-player view of the multi-player wagering game, different from the first-player view, and visible to the second player in the second viewing zone and not to the first player in the first viewing zone. Another type of embodiment is directed to at least one non-transitory processor-readable storage medium storing processor-executable instructions that, when executed, perform a method of providing multi-player wagering game play on a wagering gaming apparatus having a display comprising an array of pixels defining a full area of the display, the display being configured to make a first set of pixels spanning substantially the full area of the display visible in a first viewing zone occupied by a first player and not in a second viewing zone occupied by a second player, and to make a second set of pixels spanning substantially the full area of the display visible in the second viewing zone and not in the first viewing zone, the method comprising: engaging the first player and the second player in playing a multi-player wagering game on the wagering gaming apparatus; displaying via the first set of pixels a first-player view of the multi-player wagering game visible to the first player in the first viewing zone and not to the second player in the second viewing zone; and displaying via the second set of pixels a second-player view of the multi-player wagering game, different from the first-player view, and visible to the second player in the second viewing zone and not to the first player in the first viewing zone.

According to an aspect of the present disclosure, a method of generating a stereoscopic 3D image of a casino game apparatus is provided, the method comprising: accessing, from a storage medium, a first static 2D image of the casino game apparatus from a first viewpoint, and a second static 2D image of the casino game apparatus from a second viewpoint; and executing stored instructions via at least one processor to: apply the first static 2D image to a surface in a virtual 3D environment as a first texture of the surface in a first view of the virtual 3D environment; apply the second static 2D image to the surface in the virtual 3D environment as a second texture of the surface in a second view of the virtual 3D environment; and generate a stereoscopic 3D image of the casino game apparatus, the stereoscopic 3D image comprising the first view of the virtual 3D environment with the first static 2D image applied as the first texture to the surface and the second view of the virtual 3D environment with the second static 2D image applied as the second texture to the surface.

According to another aspect of the present disclosure, a device for generating a stereoscopic 3D image of a casino game apparatus is provided, the device comprising: at least one processor; and at least one processor-readable storage medium storing processor-executable instructions that, when executed by the at least one processor, cause the at least one processor to perform acts comprising: accessing, from a storage medium, a first static 2D image of the casino game apparatus from a first viewpoint, and a second static 2D image of the casino game apparatus from a second viewpoint, applying the first static 2D image to a surface in a virtual 3D environment as a first texture of the surface in a first view of the virtual 3D environment, applying the second static 2D image to the surface in the virtual 3D environment as a second texture of the surface in a second view of the virtual 3D environment, and generating a stereoscopic 3D image of the casino game apparatus, the stereoscopic 3D image comprising the first view of the virtual 3D environment with the first static 2D image applied as the first texture to the surface and the second view of the virtual 3D environment with the second static 2D image applied as the second texture to the surface.

According to another aspect of the present disclosure, at least one processor-readable storage medium encoded with processor-executable instructions is provided. When executed, the instructions cause a processor to perform acts for generating a stereoscopic 3D image of a casino game apparatus, the acts comprising: accessing, from a storage medium, a first static 2D image of the casino game apparatus from a first viewpoint, and a second static 2D image of the casino game apparatus from a second viewpoint; applying the first static 2D image to a surface in a virtual 3D environment as a first texture of the surface in a first view of the virtual 3D environment; applying the second static 2D image to the surface in the virtual 3D environment as a second texture of the surface in a second view of the virtual 3D environment; and generating a stereoscopic 3D image of the casino game apparatus, the stereoscopic 3D image comprising the first view of the virtual 3D environment with the first static 2D image applied as the first texture to the surface and the second view of the virtual 3D environment with the second static 2D image applied as the second texture to the surface.

According to an aspect of the present disclosure, a method of generating a stereoscopic 3D visual image depicting a physical casino game apparatus with improved fidelity, by applying multiple static 2D images of the physical casino game apparatus as surface textures to a surface in a virtual 3D environment to form an integrated stereoscopic 3D visual stimulus, is provided, the method comprising: accessing, from a storage medium, a first static 2D image of the physical casino game apparatus taken from a first viewpoint, and a second static 2D image of the physical casino game apparatus taken from a second viewpoint; and executing stored instructions via at least one processor to: apply the first static 2D image to a surface in a virtual 3D environment as a first texture of the surface in a first view of the virtual 3D environment; apply the second static 2D image to the surface in the virtual 3D environment as a second texture of the surface in a second view of the virtual 3D environment; and generate a stereoscopic 3D visual image of the casino game apparatus, the stereoscopic 3D visual image comprising the first view of the virtual 3D environment with the first static 2D image applied as the first texture to the surface and the second view of the virtual 3D environment with the second static 2D image applied as the second texture to the surface.

According to another aspect of the present disclosure, a method of displaying stereoscopic 3D images of a casino game apparatus is provided, the method comprising: determining positions of heads of two or more viewers of a display device, the positions including a first position of a head of a first viewer and a second position of a head of a second viewer; determining viewpoints of the two or more viewers based, at least in part, on the positions of the heads of the two or more viewers, the viewpoints including a first viewpoint of the first viewer and a second viewpoint of the second viewer; generating stereoscopic 3D images depicting the casino game apparatus from approximately the viewpoints of the two or more viewers, the stereoscopic 3D images including a first stereoscopic 3D image from the first viewpoint of the first viewer and a second stereoscopic 3D image from the second viewpoint of the second viewer; displaying, with a first set of pixels of the display device configured to be visible to the first viewer, the first stereoscopic 3D image of the casino game apparatus from the first viewpoint of the first viewer; and displaying, with a second set of pixels of the display device configured to be visible to the second viewer, the second stereoscopic 3D image of the casino game apparatus from the second viewpoint of the second viewer, wherein the first and second stereoscopic 3D images of the casino game apparatus are display simultaneously to the first and second viewers based, at least in part, on the detected first and second viewpoints of the first and second viewers.

According to another aspect of the present disclosure, a method of displaying stereoscopic 3D images of two or more casino game machines is provided, the method comprising: generating two or more stereoscopic 3D images depicting the two or more casino game machines, respectively, the two or more casino game machines including first and second casino game machines, the two or more stereoscopic 3D images including a first stereoscopic 3D image of the first casino game machine and a second stereoscopic 3D image of the second casino game machine; displaying, with a first set of pixels of a display device configured to be visible in a first viewing zone, the first stereoscopic 3D image of the first casino game machine; and displaying, with a second set of pixels of the display device configured to be visible in a second viewing zone, the second stereoscopic 3D image of the second casino game machine, wherein the first and second stereoscopic 3D images of the respective first and second casino game machines are displayed simultaneously in the respective first and second viewing zones.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
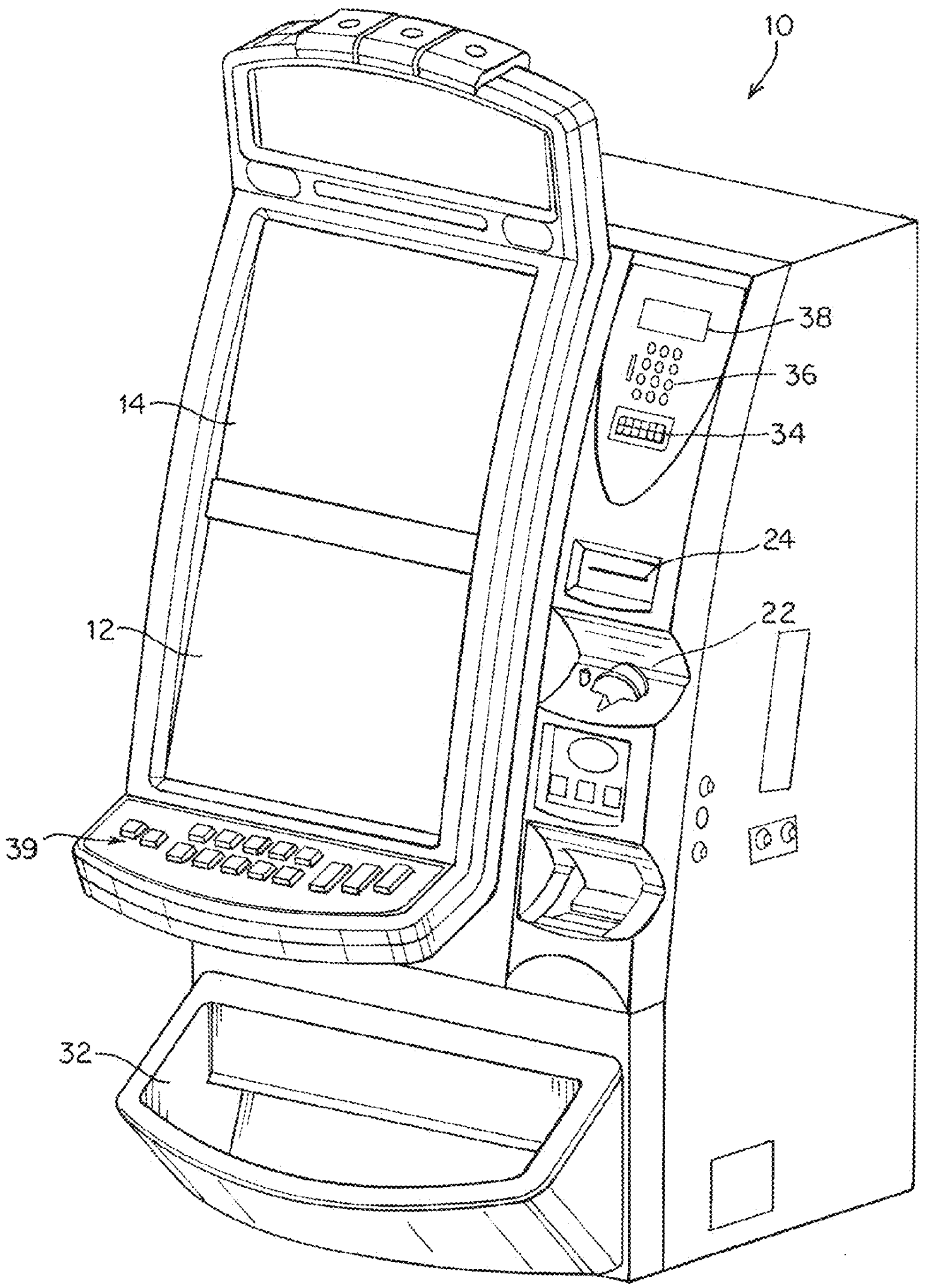
FIG. 1 is a perspective view illustrating an exemplary cabinet housing a casino game machine in accordance with some embodiments.

To a typical viewer, conventional 3D images of a virtual 3D environment may appear unrealistic, such that the viewer may easily perceive the virtual 3D environment to be artificial. The unrealistic appearance of the 3D images and the artificial nature of the virtual 3D environment may be particularly noticeable to a typical viewer when the 3D images are generated in real-time based on a computerized model of the 3D environment, because conventional techniques for generating high-quality 3D images based on computerized models may require a large amount of computation. For example, in conventional 3D images of a virtual 3D environment, the appearance of objects with fine-grained visual attributes (e.g., hair, grass, or leaves) and the interaction of light with other elements of a virtual 3D environment may lack realism, particularly when the images are generated in real-time.

In the context of casino gaming, the perception of a virtual 3D casino game machine as being artificial or unrealistic may cause some customers to lose interest in the game. A customer may perceive a virtual 3D casino game machine to be artificial because fine-grained visual attributes of the virtual game machine may appear unrealistic in 3D images thereof. For example, lighting effects (e.g., the appearance of light provided by light sources within the virtual game machine), reflections (e.g., the interaction of reflective surfaces of the virtual game machine with light provided by light sources internal or external to the virtual game machine), and surface imperfections (e.g., dirt, scratches, smudges, and/or discolorations of surfaces of the virtual game machine) may appear unrealistic in 3D images of the virtual game machine. Thus, there is a need to provide more realistic 3D images of a virtual 3D casino game machine at lower computational expense. Doing so may enhance casino revenue by increasing customer interest in games played on virtual game machines.

The inventors have recognized and appreciated that the computational expense of generating realistic 3D images of a virtual 3D environment may be lowered by using different 2D images, which depict an object from different viewpoints, as textures of a surface of virtual object in views of the virtual object generated from different viewpoints. According to an aspect of the present disclosure, two or more 2D images depicting an object from two or more respective viewpoints may be acquired. In some embodiments, the two or more 2D images may be images (e.g., photographs) of a real-world object. One of the 2D images may be used as a surface texture of an object in a first view depicting a virtual 3D environment from a first viewpoint. Another of the 2D images may be used as a texture of the same surface of the same object in a second view depicting the virtual 3D environment from a second viewpoint. The different views of the virtual 3D environment may be used to form a 3D image of the virtual 3D environment. In some embodiments, the computational expense of forming the 3D image using the above-described techniques may be lower than the computational expense of forming a 3D image of similar quality using conventional 3D image-generation techniques.

In some embodiments, a single texture may be applied to a surface of an object in the virtual 3D environment in different views of the environment from different viewpoints. Although the projections of such an object's surface texture onto the different views may differ, the underlying surface texture from which the projections are generated may be the same. The texture may be dynamic, such that the texture applied to the object's surface has different visual states at different times.

In some embodiments, the object depicted in the 2D images may be a casino game machine (e.g., a reel-spinning machine). In some embodiments, different 2D images may be applied as textures to a surface of a virtual casino game machine (e.g., a panel surface of a virtual reel-spinning machine) in different views of the virtual game machine. In some embodiments, a single texture may be applied to another surface of the virtual game machine (e.g., a surface of a reel, a surface of a meter area, or a surface of a message component) in different views of the virtual game machine. The texture may be dynamic (e.g., symbols depicted on the surface texture of the reel, meter area, or message component may change over time).

The inventors have also recognized and appreciated that the computational expense of generating realistic 3D images of a virtual 3D environment may be lowered by using differential illumination information derived from 2D images to model the effects of light provided by light sources in a virtual 3D environment. According to another aspect of the present disclosure, first and second 2D images of an environment may be acquired, such that a light source is active ("on") in the first image and inactive ("off") in the second image. The first and second 2D images may depict the environment from the same viewpoint. The second image may be subtracted from the first image to generate differential illumination information. The differential illumination information may indicate attributes of the light provided by the light source in the context of the environment (e.g., the location, intensity, brightness, color, whiteness, etc. of the light as reflected, transmitted, refracted, absorbed, etc. by various portions of the environment). The differential illumination information may be added to a view of a virtual 3D environment to compose a view of the virtual 3D environment in which the light source is active. The virtual 3D environment may model the environment depicted in the 2D images. The 2D images of the environment and the view of the virtual 3D environment may be depicted from substantially the same viewpoint.

When conventional 3D display techniques are used to display 3D images of an environment, the typical viewer may still perceive the images or the environment as being artificial, even in cases where the images themselves are of high quality. For example, with some conventional 3D display techniques, a 3D image of an environment (e.g., a virtual 3D environment or a real-world 3D environment) may be presented to the viewer from the same viewpoint, irrespective of the position of the viewer's head or eyes. Even when a 3D display provides movement parallax, such that 3D images of the environment are presented to the viewer from different viewpoints based on the position of the viewer's head or eyes, the number of different views available to the viewer may be small, such that transitions between 3D images from different viewpoints may be sudden and discontinuous. Unnatural transitions between views of the environment from widely divergent viewpoints may be uncomfortable, unsettling, or simply unpalatable to the typical viewer. Also, some 3D displays that provide movement parallax are not capable of displaying different 3D views of an environment to multiple viewers simultaneously, making it difficult or impossible for multiple viewers to jointly experience the environment. In some contexts, such as the home entertainment context and the casino gaming context, the absence of fine-grained movement parallax and the absence of support for multiple simultaneous viewers may limit the typical viewer's interest in viewing 3D content or playing 3D games.

The inventors have recognized and appreciated techniques for simultaneously displaying 3D images to multiple viewers, with movement parallax. According to an aspect of the present disclosure, the head positions of a display device's viewers may be tracked and used to determine the viewers' viewpoints. Stereoscopic 3D images of a 3D environment may be generated, with the 3D images depicting the 3D environment from the viewers' viewpoints. The 3D images may be displayed simultaneously using subsets of the display device's pixels. For example, a first set of pixels configured to be visible to a first viewer may display a first stereoscopic 3D image depicting the 3D environment from the first viewer's viewpoint, while a second set of pixels configured to be visible to a second viewer may display a second stereoscopic 3D image depicting the 3D environment from the second viewer's viewpoint. In some embodiments, the 3D environment depicted in the stereoscopic 3D images may include a virtual casino game machine. In some embodiments, stereoscopic 3D images of different 3D environments may displayed to different viewers. In some embodiments, the movement parallax may be fine-grained.

In some embodiments, the pixels of a display device of a wagering gaming apparatus may be divided into different subsets configured to be visible to different players occupying different viewing zones in front of the display. This may allow a multi-player wagering game to be played on the wagering gaming apparatus, with different views of the multi-player wagering game being displayed to the different players in the different viewing zones. For example, in some embodiments, a first player occupying a first viewing zone may be shown a first-player view of the multi-player wagering game via a first set of pixels of the display, while a second player occupying a second viewing zone may be shown a different second-player view of the multi-player wagering game via a second set of pixels of the display. The first-player view of the multi-player wagering game may include, for example, images and/or information not shown to the second player in the second-player view of the multi-player wagering game, and vice-versa. In some embodiments, the multi-player wagering game may involve cooperation and/or competition between the different players to produce an outcome of the wagering game, based at least in part on the differing images and/or information shown in the different player views. In some embodiments, each of the different player views of the multi-player wagering game may be a 2D image displayed in the respective viewing zone. In other embodiments, each of the different player views may be a stereoscopic (e.g., autostereoscopic) 3D view. In some embodiments, a lenticular lens may be used to project the views from different sets of pixels of the display to the different viewing zones.

According to another aspect of the present disclosure, stereoscopic 3D images of different 3D environments may be simultaneously displayed in different viewing zones of a display device using different subsets of the display device's pixels.

It should be appreciated that the foregoing description is by way of example only, and embodiments are not limited to providing any or all of the above-described functionality, although some embodiments may provide some or all of the functionality described herein.

The embodiments described herein can be implemented in any of numerous ways, and are not limited to any particular implementation techniques. Thus, while examples of specific implementation techniques are described below, it should be appreciated that the examples are provided merely for purposes of illustration, and that other implementations are possible.

One illustrative application for the techniques described herein is for use with a display device configured to display 3D images of a casino game machine. However, techniques described herein may be applied to display 3D images of any type of environment.

The aspects and embodiments described above, as well as additional aspects and embodiments, are described further below. These aspects and/or embodiments may be used individually, all together, or in any combination, as the application is not limited in this respect.

As used herein, a "virtual 3D environment" may include, without limitation, any suitable computer-based, simulated environment (e.g., an environment having at least one attribute generated by or derived from a computer-based model) which includes at least one object having a three-dimensional graphical representation.

As used herein, a "3D image" may include, without limitation, any suitable representation of an environment (e.g., a real environment or a virtual environment), which, when displayed, visually conveys at least stereo parallax information about the environment.

As used herein, a "viewpoint" may include, without limitation, a position from which an environment is viewed or imaged, a position from which an environment is depicted in an image of the environment, and/or a spatial relationship between two reference points or objects. A viewpoint may be characterized by a distance and direction between two positions. For example, a viewpoint may be characterized by a distance and direction from a viewed or imaged environment (e.g., from a point or object included in the environment) to the position from which the environment is viewed or imaged. A viewpoint may be specified using any suitable technique, including, without limitation, relative or absolute coordinates in a coordinate system (e.g., a Cartesian coordinate system or a spherical coordinate system)

As used herein, a "view" may include, without limitation, an image (e.g., a 2D image and/or perspective image) of a 3D environment from a viewpoint.

FIG. 1 shows a perspective view of an exemplary cabinet 10 housing a casino game machine in accordance with some embodiments. Exemplary cabinet 10, as depicted in FIG. 1, includes a display 12, a second display 14, a coin slot 22, a coin tray 32, a card reader slot 34, a keypad 36, and player control buttons 39.

Display 12 may include at least one three-dimensional (3D) display for displaying 3D images of one or more 3D environments (e.g., virtual or real-world 3D environments). Embodiments of the 3D display device may be implemented using any suitable type of display component, including, without limitation, a thin film transistor (TFT) display, a liquid crystal display (LCD), a cathode ray tube (CRT) display, a light-emitting diode (LED) display, and/or an organic LED (OLED) display.

In some embodiments, the 3D display device may be a stereoscopic display, an autostereoscopic display, a holographic display, a volumetric display, a compressive light field display, a side-by-side viewing display, a display with filter arrays, and/or any other suitable 3D display. In embodiments where the 3D display device includes an autostereoscopic display, the autostereoscopic display may include any suitable component(s) for directing images to specified viewers or viewing regions, including, without limitation, a parallax barrier, a lenticular lens, and/or an integral imaging array. In embodiments where the 3D display device includes a stereoscopic display, the stereoscopic display may include any suitable viewing device, including, without limitation, any suitable active 3D viewer or passive 3D viewer.

In some embodiments, the 3D display device may display any suitable type of 3D image using any suitable technique, including, without limitation, anaglyph images, polarized projections, autostereoscopic images, computer-generated holograms, volumetric images, infra-red laser projections, auto stereograms, pulfrich effects, prismatic and self-masking crossview glasses, lenticular prints, wiggle stereoscopy, active 3D viewers (e.g., liquid crystal shutter glasses, red eye shutter glasses, virtual reality headsets, personal media viewers, etc.), and/or passive 3D viewers (e.g., linearly polarized glasses, circularly polarized glasses, interference filter technology glasses, complementary color anaglyphs, compensating diopter glasses for red-cyan method, ColorCode 3D, ChromaDepth method and glasses, Anachrome compatible color anaglyph method, etc.). In some embodiments, the 3D display device may comprise a display manufactured by SeeFront GmbH.

Second display 14 may provide game data or other information in addition to the information provided by display 12. Display 14 may provide static information, such as an advertisement for the game, the rules of the game, pay tables, pay lines, and/or other information, and/or may even display the main game or a bonus game along with display 12. Alternatively, the area for display 14 may be a display glass for conveying information about the game. In some embodiments, display 12 may include a camera for use, for example, in generating and/or displaying autostereoscopic 3D images.

Display 12 and/or display 14 may have a touch screen lamination that includes a transparent grid of conductors. A player touching the screen may change the capacitance between the conductors, and thereby the X-Y location of the touch on the screen may be determined. A processor within cabinet 10 may associate this X-Y location with a function to be performed. There may be an upper and lower multitouch screen in accordance with some embodiments.

A coin slot 22 may accept coins or tokens in one or more denominations to generate credits within the casino game machine for playing games. An input slot 24 for an optical reader and printer may receive machine readable printed tickets and may output printed tickets for use in cashless gaming.

A coin tray 32 may receive coins or tokens from a hopper (not shown) upon a win or upon the player cashing out. However, in some embodiments, the casino game machine may not pay in cash, but may only issue a printed ticket for cashing in elsewhere. Alternatively, a stored value card may be loaded with credits based on a win, or may enable the assignment of credits to an account associated with a computer system, which may be a computer network-connected computer system.

A card reader slot 34 may accept any of various types of cards, such as smart cards, magnetic strip cards, and/or other types of cards conveying machine readable information. The card reader may read the inserted card for player and/or credit information for cashless gaming. The card reader may read a magnetic code on a conventional player tracking card, where the code uniquely identifies the player to the host system. The code may be cross-referenced by the host system to any data related to the player, and such data may affect the games offered to the player by the casino game machine. The card reader may also include an optical reader and printer for reading and printing coded barcodes and other information on a paper ticket. A card may also include credentials that enable the host system to access one or more accounts associated with a user. The account may be debited based on wagers by a user and credited based on a win.

A keypad 36 may accept player input, such as a personal identification number (PIN) and/or any other player information. A display 38 above keypad 36 may display a menu for instructions and/or other information, and/or may provide visual feedback of the keys pressed. The keypad 36 may be an input device such as a touchscreen, or dynamic digital button panel, in accordance with some embodiments.

Player control buttons 39 may include any buttons and/or other controllers usable for the play of the particular game or games offered by the casino game machine, including, for example, a bet button, a repeat bet button, a spin reels (or play) button, a maximum bet button, a cash-out button, a display pay lines button, a display payout tables button, select icon buttons, and/or any other suitable button(s). In some embodiments, buttons 39 may be replaced by a touch screen with virtual buttons. In some embodiments, touchless control gesture functionality may replace or coexist with buttons 39.

Although embodiments have been described in which a 3D display device is included in a cabinet 10 housing a casino game machine, some embodiments are not limited in this manner. Some embodiments may be implemented using any suitable 3D display device, whether standing alone or included in another device (e.g., a 3D television, a mobile computing device, a head-mounted display, a cabinet 10 housing a casino game machine, or any other suitable device).

Figure 2:
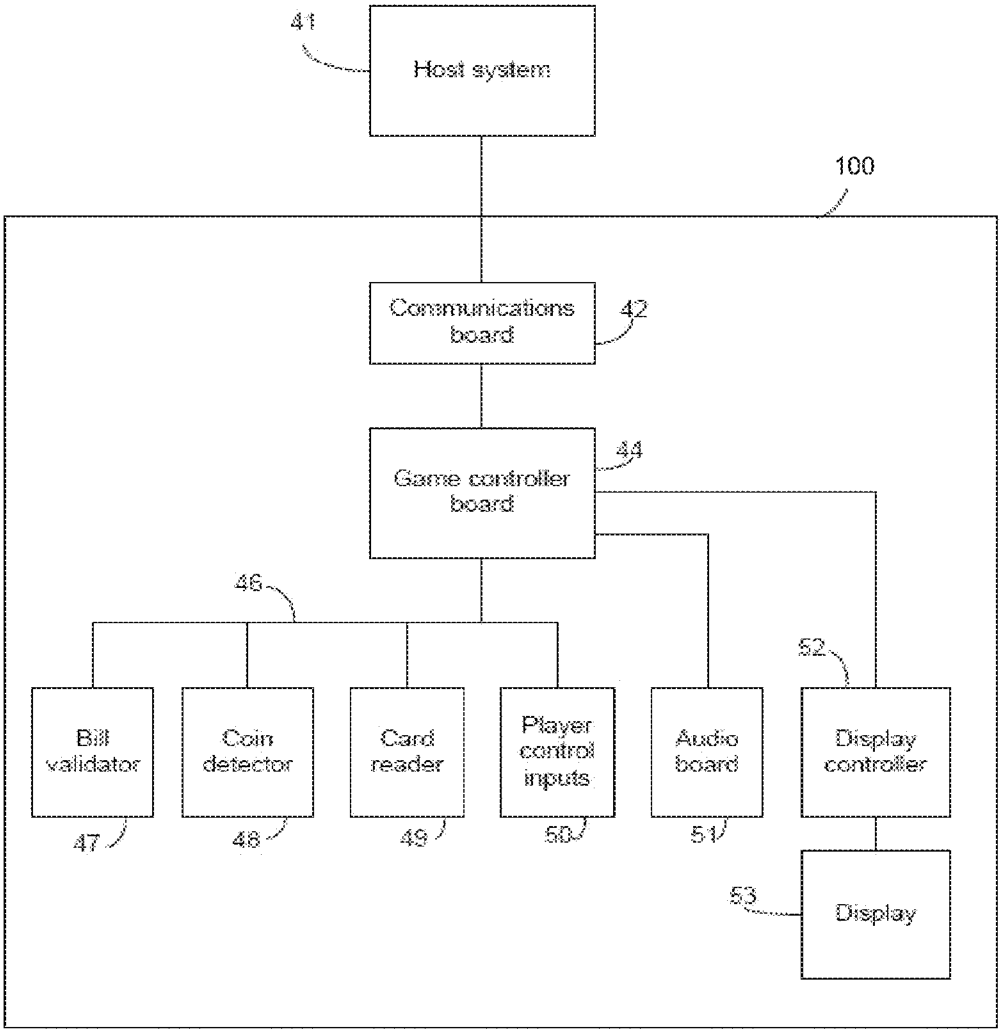
FIG. 2 is a block diagram of a casino game machine linked to a casino's host system in accordance with some embodiments.

FIG. 2 is a block diagram of an exemplary casino game machine 100 (such as may be housed in exemplary cabinet 10) linked to a casino's host system 41, in accordance with some embodiments. In the example shown, a communications board 42 may contain circuitry for coupling the casino game machine 100 to a local area network (LAN) and/or other type of network using any suitable protocol, such as the G2S protocols. Internet protocols are typically used for such communication under the G2S standard, incorporated herein by reference. Communications board 42 may transmit using a wireless transmitter, and/or may be directly connected to a network running through the casino (e.g., throughout the casino floor). Communications board 42 may set up a communication link with a master controller and may buffer data between the network and game controller board 44. Communications board 42 may also communicate with a network server, such as in accordance with the G2S standard, for exchanging information to carry out embodiments described herein.

Game controller board 44 may contain memory and one or more processors for carrying out programs stored in the memory and for providing the information requested by the network. Game controller board 44 may execute programs stored in the memory and/or instructions received from host system 41 to carry out game routines. In some embodiments, game controller board 44 may execute programs stored in the memory and/or instructions received from host system 41 to perform one or more techniques described herein (e.g., techniques for generating 3D images and/or techniques for controlling a 3D display device to display 3D images). In some embodiments, game controller board 44 may execute programs stored in the memory and/or instructions received from host system 41 to perform one or more tasks described herein.

Peripheral devices/boards may communicate with game controller board 44 via a bus 46 using, for example, an RS-232 interface. Such peripherals may include a bill validator 47, a coin detector 48, a smart card reader and/or other type of credit card reader 49, and/or player control inputs 50 (such as buttons 39 and/or a touch screen).

Game controller board 44 may also control one or more devices that produce the game output including audio and video output associated with a particular game that is presented to the user. For example, audio board 51 may convert coded signals into analog signals for driving speakers. Display controller 52 may convert coded signals into pixel signals for one or more displays 53 (e.g., display 12 and/or display 14). Display controller 52 and audio board 51 may be directly connected to parallel ports on game controller board 44. In some embodiments, the electronics on the various boards may be combined in any suitable way, such as onto a single board. Casino game machine 100 may be implemented using one or more computers; an example of a suitable computer is described below.

Figure 3:
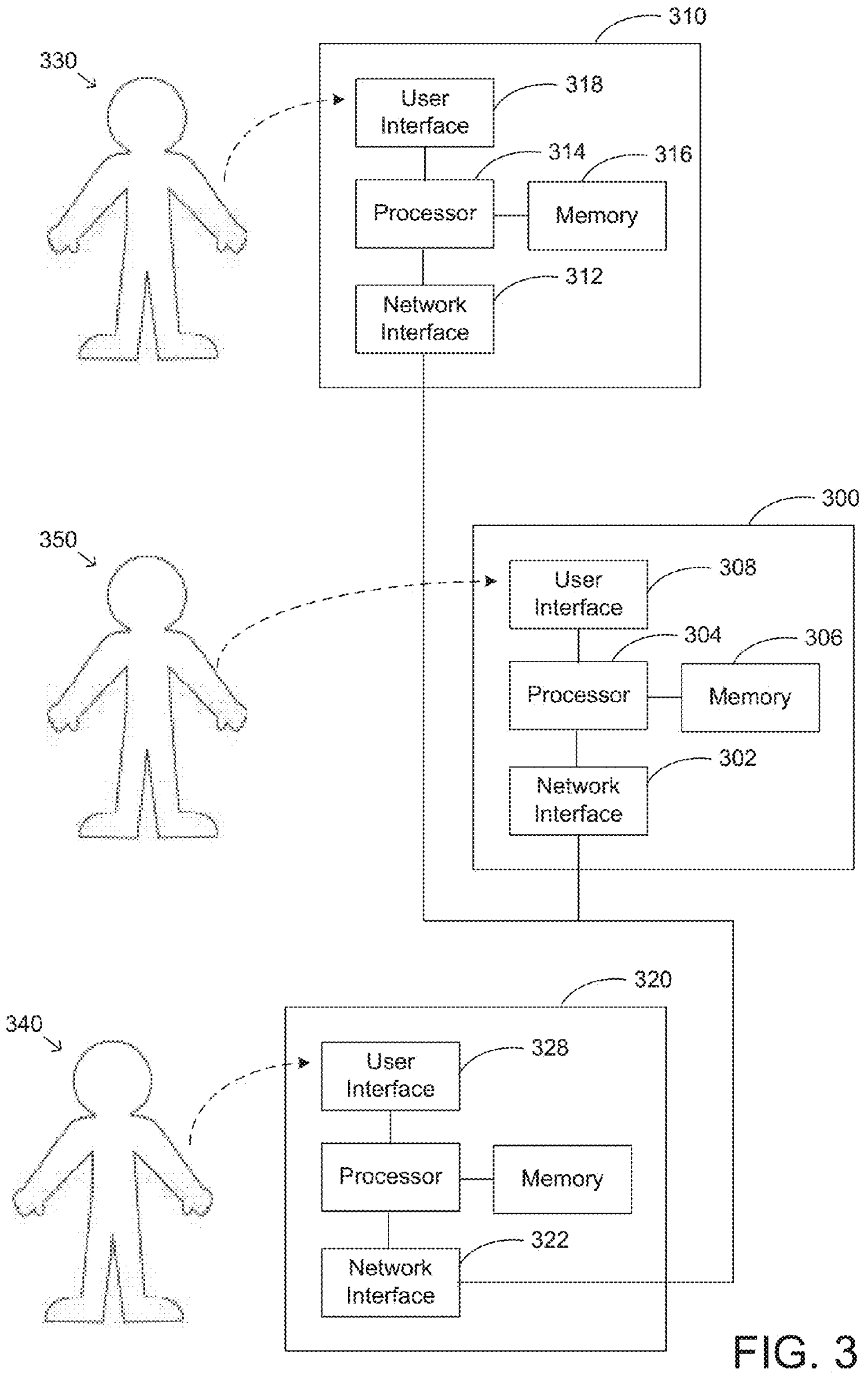
FIG. 3 is a block diagram illustrating an exemplary operating environment for a casino game machine in accordance with some embodiments.

FIG. 3 illustrates an operating environment including an exemplary control system 310 that may be used in some embodiments to control a casino game machine, such as exemplary casino game machine 100, in accordance with one or more embodiments. Control system 310 may be implemented in any suitable form, as embodiments are not limited in this respect. For example, control system 310 may be implemented as a single stand-alone machine, or may be implemented by multiple distributed machines that share processing tasks in any suitable manner. Control system 310 may be implemented as one or more computers; an example of a suitable computer is described below.

In some embodiments, control system 310 may include one or more tangible, non-transistory processor-readable storage devices storing processor-executable instructions, and one or more processors that execute the processor-executable instructions to perform one or more tasks and/or processes described herein, including, but not limited to, image-generation tasks and/or processes, display-control tasks and/or processes, etc. The storage devices may be implemented as computer-readable storage media (i.e., tangible, non-transitory computer-readable media) encoded with the processor-executable instructions; examples of suitable computer-readable storage media are discussed below. An example of a suitable storage medium is memory 316 depicted in FIG. 3, which is operatively connected to processor 314 for executing instructions stored in memory 316. In one example, processor 314 and memory 316 may be a processor and memory contained in game controller board 44, which may provide functionality for operating one or more games on casino game machine 100, in addition to providing control functionality described herein. In another example, processor 314 and/or memory 316 may be separate from game controller board 44 and may assert control signals upon game controller board 44 for affecting the operation of game controller board 44 in operating one or more games on casino game machine 100. When components of control system 310 are separate from components of casino game machine 100 described above, the components of control system 310 may be housed in any suitable location in any suitable configuration, within and/or attached to cabinet 10 and/or separated therefrom.

Exemplary control system 310 also includes a user interface component 318 configured to allow a user (player) 330 to interact with the casino game machine. User interface component 318 may be implemented in any suitable form, as embodiments are not limited in this respect. In some embodiments, user interface component 318 may be configured to receive input from player 330 in any suitable form, such as by button, touchscreen, touchless control gesture, speech commands, etc., and may be configured to provide output to player 330 in any suitable form, such as audio output and/or visual output on a 2D or 3D display. In one exemplary embodiment, user interface component 318 may include one or more components of casino game machine 100 housed in cabinet 10, such as player control inputs 50, audio board 51, display controller 52, and/or displays 53.

FIG. 3 further illustrates an example of a casino environment including a central control system 300 having an interface 302 for wired and/or wireless communication with local control systems for casino game machines 310 and 320 (and possibly other casino game machines) via their respective network interfaces 312 and 322. Exemplary central control system 300 includes one or more processors 304 and memory 306 (e.g., one or more processor-readable storage media) storing processor-executable instructions for causing processor 304 to perform functions such as transmitting control commands to casino game machines 310 and 320. For example, central control system 300 may, through execution by processor 304 of stored program instructions, stream game content to casino game machines 310 and 320 and/or instruct casino game machines 310 and 320 to implement game adjustments selected by central control system 300 at times determined by central control system 300. In various embodiments, gaming functionality may be distributed between central control system 300 and game machine terminals such as 310 and 320 in any suitable way, making use of any suitable division of functionality. For instance, in some exemplary embodiments, central control system 300 may download games to game machine terminals 310 and/or 320, which may execute the game programs including performing random number generation for determining probabilistic symbol outcomes. In other exemplary embodiments, central control system 300 may perform random number generation and execute game programs for game machine terminals 310 and/or 320, which may merely display output (e.g., 3D images) received from central control system 300 and collect user input from users 330 and 340 via user interfaces 318 and 328 for transmission to central control system 300 via the network interfaces. In some embodiments, central control system 300 may have its own user interface 308 for interaction with a user 350. In some embodiments, central control system 300 may also be configured to function as a casino game machine with player interaction capabilities. However, in other embodiments, central control system 300 may simply function as a server providing functions to other casino game machines such as 310 and 320.

In some embodiments, one or more processors of a casino game machine and/or a central control system providing functionality to the casino game machine may execute stored instructions to present a reel-spinning game to a player via user interface components of the casino game machine. The form of play of the reel-spinning game may be to virtually spin a set of virtual reels having various symbols arranged (e.g., located at regularly spaced intervals ("stops")) on the reels. Portions of the virtual reels may be displayed by a display device of the casino game machine as if the physical reels were placed side-by-side behind a window that leaves only a limited number of symbols on each reel visible through the window at any time. The player may place a wager on one or more paylines, each forming a pattern of symbol locations within the window on the reels. When the reels are spun, the symbols that appear in the window on the display when the reels stop spinning may be checked along each of the paylines on which a wager was placed, to determine whether any winning symbol combinations occur on those paylines to result in a payout to the player.

Figure 4:
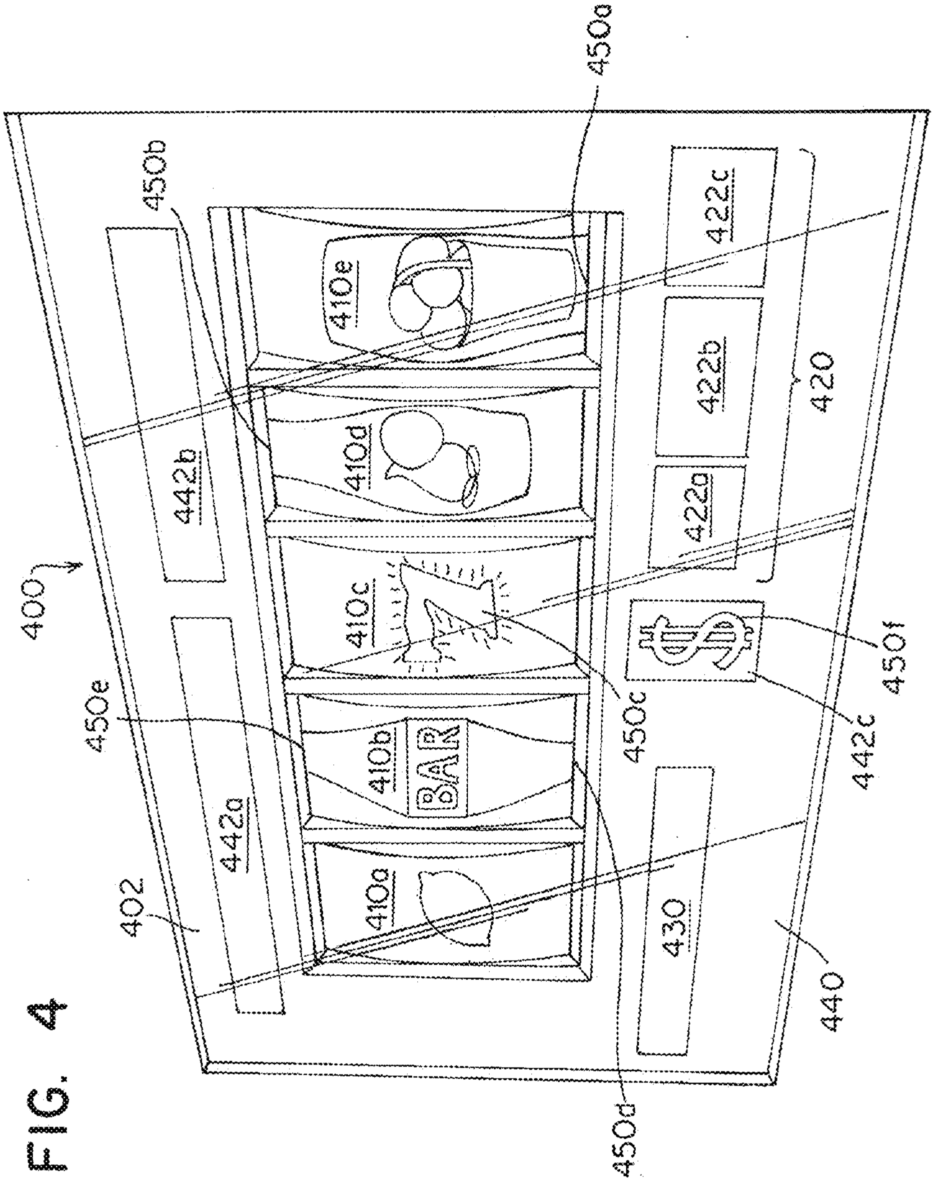
FIG. 4 is a perspective view illustrating a main portion of a reel-spinning game machine with mechanical reels, according to some techniques.

FIG. 4 shows a main portion 400 of a reel-spinning game machine. In the example of FIG. 4, main portion 400 of the game machine includes a window 402 which covers a panel 440, mechanical reels 410, a meter area 420 with meter components 422, a message component 430, and light sources 450. Window 402 may be transparent or semi-transparent, such that components of the game machine are visible to the viewer. Window 402 may be formed of any suitable material, such as glass or plastic. Panel 440 may be separated from window 402 by a short distance (e.g., a few millimeters to a few inches), and may function as a decorative barrier that obscures internal components of the game machine from view. Panel 440 may include one or more graphic areas 442*a-c*, which may display any suitable graphics, such as promotional or instructional words, symbols, or images.

Message component 430 may display any suitable message, such as a message of encouragement (e.g., "Good luck!"), an instructional message (e.g., "Pull the lever to spin the reels," or "Collect your winnings"), a congratulatory message (e.g., "Congratulations"), a descriptive message (e.g., "Jackpot!" or "You lost"), etc. Message component 430 may be implemented using any suitable display technology, such as an LCD display or LED display. The game machine may control the message displayed by message component 430 by applying suitable signals to message component 430. Although a single message component 430 is illustrated in FIG. 4, portion 400 of the game machine may include any suitable number of message components.

Meter components 422*a-c* may display wagers (e.g., a player's wager on a current spin), credits (e.g., the total credits currently available to the player for wagering on the reel-spinning machine), and/or winnings/losses (e.g., the player's total winnings or losses since beginning a session on the reel-spinning game machine). Meter components 422*a-c* may be implemented using any suitable display technology, such as one or more LCD displays or LED displays. The game machine may control the values displayed by meter components 422*a-c* by applying suitable signals to meter components 422*a-c*. Although three meter components 422*a-c* are illustrated in FIG. 4, portion 400 of the game machine may include any suitable number of meter components.

In the example of FIG. 4, the game machine includes five reels 410*a-e*, though a reel-spinning game machine may include any suitable number of reels. A reel 410 may comprise a rotatable cylinder with a strip of symbols applied to its surface. When a player initiates a spin of the reels, some or all of the reels may rotate at any suitable speed for any suitable number of rotations, and different reels may rotate at different speeds and/or for different numbers of rotations. As described above, the player may place a wager on one or more paylines, and the final locations of the symbols on the reels (after the reels are spun) determine whether the player wins one or more wagers.

Portion 400 of the game machine may include one or more light sources, such as light sources 450*a-f*. Light sources may be disposed in any suitable locations, such as the top (450*b*, 450*e*) or bottom (450*a*, 450*d*) of an opening in panel 440 through which a reel is visible, within or on (450*c*) a reel, in or near (450*f*) a graphic area of panel 440, etc. The game machine may activate one or more of the light sources for any suitable purpose (e.g., to attract the attention of potential players, or to highlight a reel showing a symbol that matches a portion of a payline on which the player has wagered). The light sources may be implemented using any suitable technology, including, without limitation, LEDs, fluorescent lamps, or neon lamps. The light sources may emit light of any suitable color.

Figure 5:
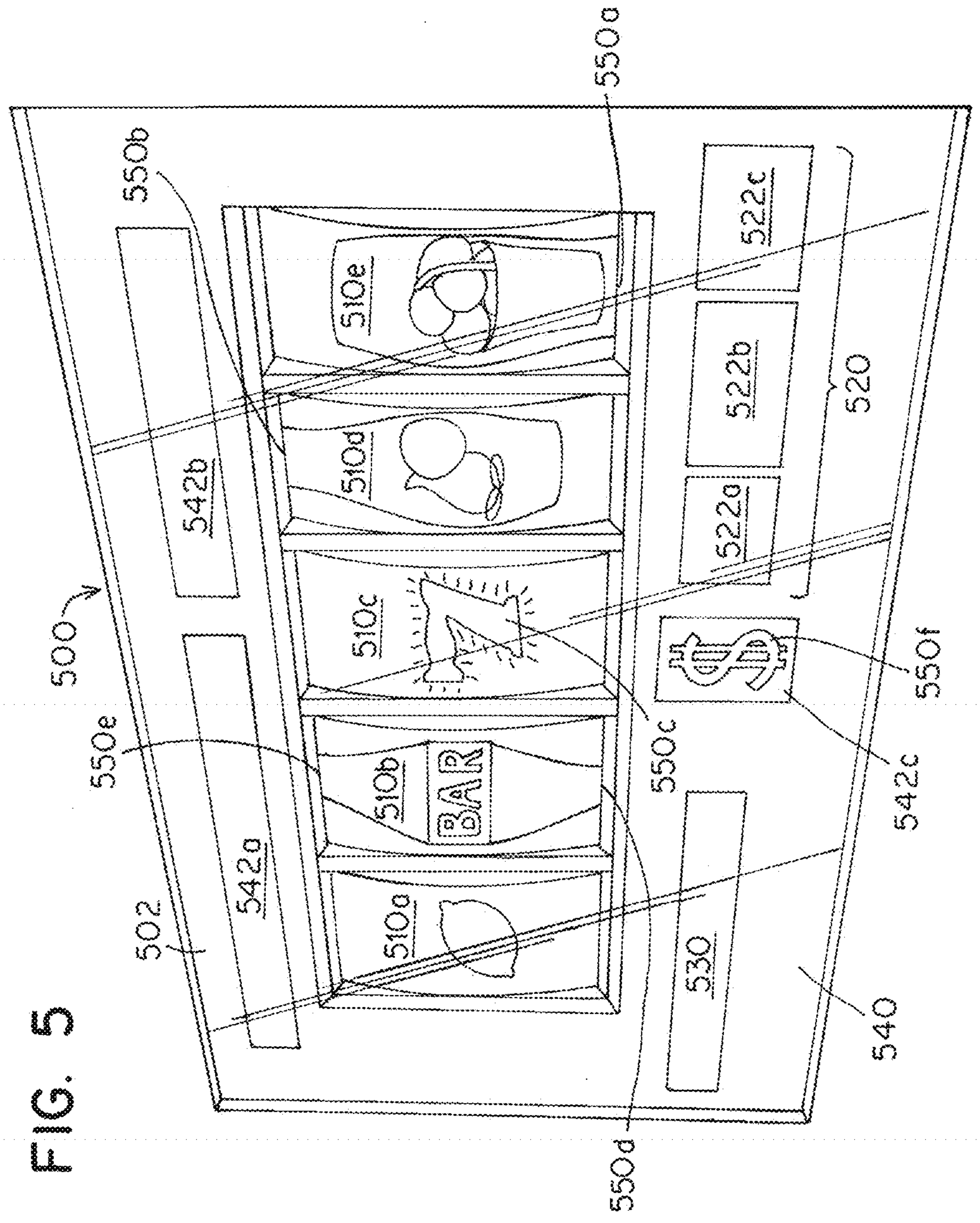
FIG. 5 is a perspective view illustrating a two-dimensional view of a main portion of a virtual reel-spinning game machine in accordance with some embodiments.

FIG. 5 shows a two-dimensional view 500 of a virtual 3D environment, in accordance with some embodiments. View 500 may depict the virtual 3D environment from a specified viewpoint. In the example of FIG. 5, the virtual 3D environment includes a virtual reel-spinning machine, and view 500 depicts a portion of virtual reel-spinning machine. As can be seen, the virtual reel-spinning machine depicted in view 500 is modeled closely on the reel-spinning machine of FIG. 4. The virtual reel-spinning machine may include a virtual cover 502, a virtual panel 540 with one or more virtual graphic areas 542, virtual mechanical reels 510, a virtual meter area with one or more virtual meter components 522, a virtual message component 530, and one or more virtual light sources 550. In some embodiments, the virtual elements illustrated in FIG. 5 may perform the same functions as the like-numbered elements of the reel-spinning machine illustrated in FIG. 4.

A view of a virtual 3D environment, such as view 500, may be generated using embodiments of techniques described herein. The following discussion of method 600, which is a method of displaying 3D images of a virtual 3D environment, refers to view 500 to illustrate how steps of method 600 may be applied to generate a view of a virtual 3D environment.

View 500 illustrates just one view of just one example of a virtual reel-spinning machine. In some embodiments, any suitable view depicting any suitable virtual reel-spinning machine from any suitable viewpoint may be generated. In some embodiments, any suitable view depicting any suitable virtual casino game machine may be generated. In some embodiments, any suitable view depicting any suitable virtual 3D environment from any suitable viewpoint may be generated. Embodiments of the techniques and apparatus described herein are not limited by the viewpoint of a view or by the virtual 3D environment depicted in a view.

Figure 6:
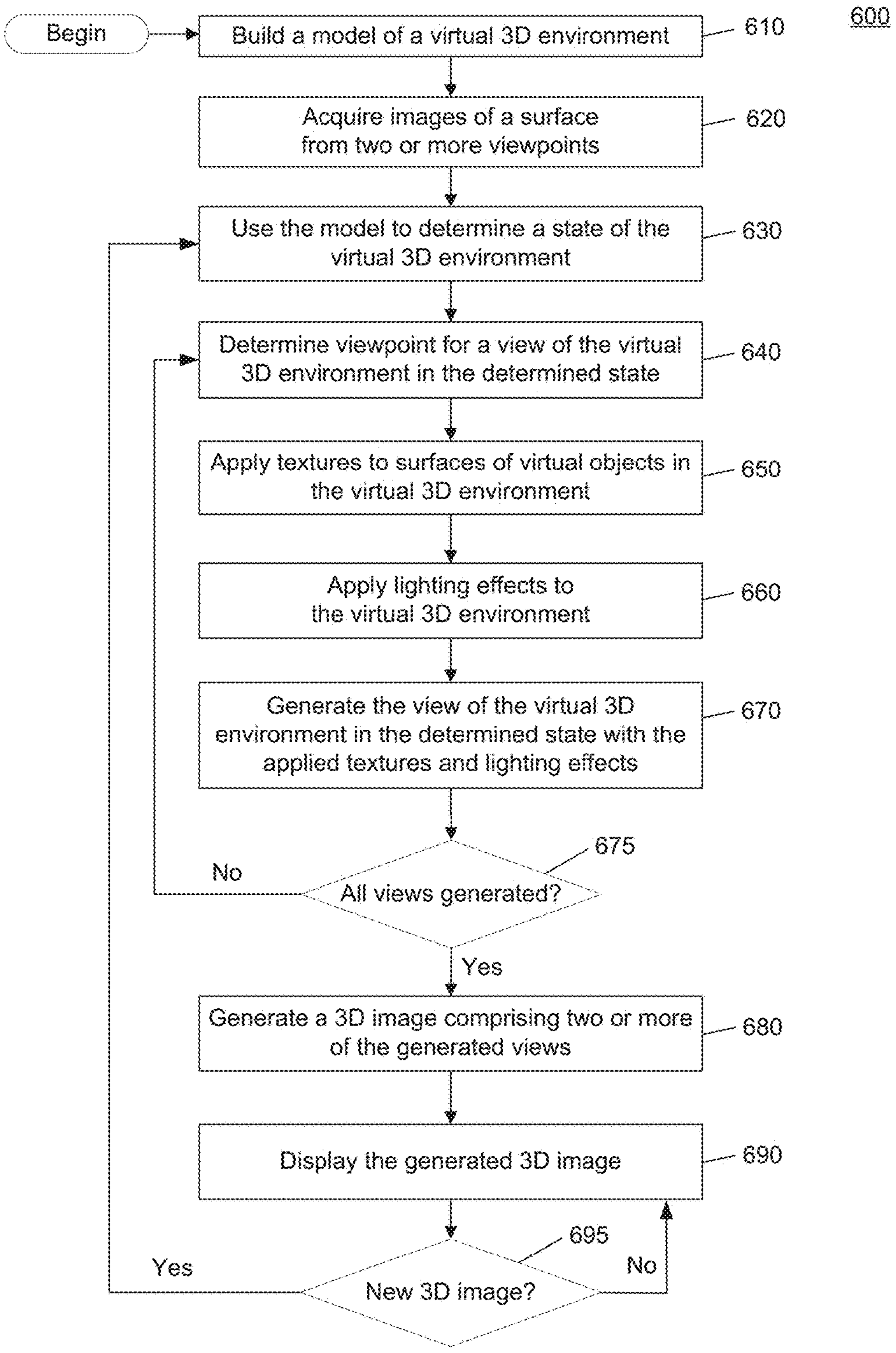
FIG. 6 is a flowchart illustrating an exemplary method of generating and displaying 3D images of a virtual 3D environment in accordance with some embodiments.

FIG. 6 shows a method 600 of generating and displaying 3D images of a virtual 3D environment in accordance with some embodiments. An overview of some embodiments of method 600 is given here, and steps of method 600 are described in detail below. In step 610, a model of a virtual 3D environment may be built. In step 620, images depicting a surface from two or more viewpoints may be acquired. In steps 630-695, 3D images of the virtual 3D environment may be generated. In step 630, the model of the virtual 3D environment may be used to determine a state of the virtual 3D environment. In steps 640-675, views depicting the 3D virtual environment in the determined state and from specified viewpoints may be generated. In step 640, a viewpoint for a view of the virtual 3D environment may be determined. In step 650, textures may be applied to surfaces of virtual objects in the virtual 3D environment. In step 660, lighting effects may be applied to the virtual 3D environment. In step 670, a view of the virtual 3D environment in the determined state and with the applied textures and lighting effects may be generated, with the view depicting the virtual 3D environment from the determined viewpoint. Steps 640-670 may be repeated to generate different views depicting the virtual 3D environment from different viewpoints. In step 680, a 3D image including two or more of the generated views may be generated. In step 690, the 3D image may be displayed. Steps 630-690 may be repeated at specified times (e.g., periodically, at a specified frame rate, etc.) or in response to specified events (e.g., changes in the state of the virtual 3D environment).

In step 610, a model of a virtual 3D environment may be built. The model may be built using wireframe modeling, a 3D engine, and/or any other suitable modeling technique, as embodiments are not limited in this respect. In some embodiments, the model may be obtained (e.g., received) from a suitable provider of virtual 3D environment models, or may be loaded from a processor-readable storage medium.

In some embodiments, the model may be capable of determining the state of the virtual 3D environment. The state of a virtual 3D environment may include the shape, position, orientation, lighting, and/or any other suitable attribute of one or more things in the virtual 3D environment, whether visual or non-visual. In some embodiments, the state of the virtual 3D environment may depend on inputs to the virtual 3D environment (e.g., inputs provided by a user through a user interface) and/or on the physics of the virtual 3D environment (e.g., modeled interactions among virtual things in the environment, and/or modeled responses of things in the environment to environmental inputs).

In step 620, images depicting a surface from two or more viewpoints may be acquired. In some embodiments, the images may depict a surface which corresponds to a virtual surface in the virtual 3D environment. In some embodiments, the images may be 2D images of real-world objects corresponding to virtual objects in the virtual 3D environment. These images may subsequently be used in one or more steps of method 600 to make 3D images of the virtual 3D environment appear more realistic (e.g., by using images depicting a surface from different viewpoints as textures of a virtual surface in a 3D image's different views of the virtual 3D environment). In some embodiments, images depicting each of two or more surfaces from two or more viewpoints may be acquired. As just one example, images depicting one or more surfaces of a reel-spinning game machine (e.g., images depicting a main portion 400 of a reel-spinning game machine) from two or more viewpoints may be acquired.

The images depicting a surface from two or more viewpoints may be acquired using any suitable technique. In some embodiments, images may be acquired by using a 3D camera to capture 2D images (e.g., photographs) from multiple viewpoints (e.g., in parallel) and/or by using two or more 2D cameras to capture 2D images (e.g., photographs) from multiple viewpoints (e.g., in parallel or sequentially). In some embodiments, the images may be acquired by extracting 2D images from one or more frames of one or more videos (e.g., a live or recorded video of a casino game machine, a mechanical reel-spinning machine, or any other suitable environment). In some embodiments, an image depicting a surface from a viewpoint may be generated as a composite of two or more images of the surface from substantially the same viewpoint. In some embodiments, an image depicting a surface from a viewpoint may be generated, in whole or in part, using image-editing software (e.g., to modify an existing image) or image-generating software (e.g., to draw, paint, or otherwise create an image).

Acquiring the images by extracting 2D images from one or more frames of a video may facilitate the generation of 3D images with realistic movement parallax. In some embodiments, the virtual 3D environment depicted in the generated 3D images may correspond, at least in part, to a real-world environment depicted in the video. In some embodiments, images depicting the real-world environment from different viewpoints may be obtained by changing the viewpoint of a camera capturing a video from which the images are extracted (e.g., by moving, panning, or tilting the camera, and/or by changing the camera's zoom setting). The images depicting the real-world environment from different viewpoints may be used to generate stereoscopic images of the virtual 3D environment from different viewpoints. In some embodiments, the viewpoint of the camera may change in response to movement of a viewer of stereoscopic images of the virtual 3D environment, and the viewpoint from which the stereoscopic images depict the virtual 3D environment may change in response to the change in the camera's viewpoint, thereby providing movement parallax responsive to the viewer's movement.

As just one example, stereoscopic images of a virtual reel-spinning game machine may be generated using 2D images of a mechanical reel-spinning game machine. The 2D images may be extracted from frames of a video depicting the mechanical reel-spinning game machine. The viewpoint from which the virtual reel-spinning game machine is depicted in the stereoscopic images may be determined by (e.g., may be the same as) the viewpoint from which a camera records the video of the mechanical reel-spinning game machine. In response to a viewer of the stereoscopic images moving, such that viewer's viewpoint of the stereoscopic images changes, the camera may be moved, tilted, panned, and/or zoomed, such that the camera's viewpoint of the mechanical reel-spinning game machine matches the viewer's viewpoint of the stereoscopic images. Since the viewpoint of the stereoscopic images of the virtual reel-spinning game machine is determined by the viewpoint of the video of the mechanical reel-spinning game machine, the viewpoint of the video may be adjusted to track the changes in the viewer's viewpoint of the images, thereby providing movement parallax to the viewer.

The images depicting a surface from two or more viewpoints may be acquired from or provided by any suitable source of images. In some embodiments, the images may be acquired from or provided by a purchaser, prospective purchaser, operator, prospective operator, user, prospective user, and/or manufacturer of a device (e.g., a casino game machine) configured to use the images to generate a 3D image of a virtual 3D environment. In some embodiments, the images may be stored in and/or loaded from a processor-readable storage medium.

In some embodiments, the images depicting a surface from two or more viewpoints may be acquired for each of two or more states of the surface. A surface's state may include the surface's position, orientation, lighting, and/or any other suitable attribute of the surface. As just one example, images depicting a main portion 400 of a mechanical reel-spinning machine from two or more viewpoints with a light source 450 inactive may be acquired, and images depicting the main portion 400 of the mechanical reel-spinning machine from two or more viewpoints with the same light source 450 active may also be acquired. Some techniques for using such images to apply lighting effects to 3D images of a virtual 3D environment are described below.

The images depicting a surface from two or more viewpoints may be acquired from any suitable viewpoints. In some embodiments, images may be acquired from viewpoints having different distances to the imaged environment. In some embodiments, the distances between the viewpoints and the imaged environment may be distributed over any suitable range (e.g., 1 mm-100 m). In some embodiments, images may be acquired from viewpoints having different angles of view of the imaged environment. In some embodiments, the viewing angles associated with the viewpoints may be distributed over any suitable range (e.g., 0-180 degrees in a horizontal direction and/or 0-180 degrees in a vertical direction).

In step 630, the model of the virtual 3D environment may be used to determine a state of the virtual 3D environment. In some embodiments, inputs to the virtual 3D environment (e.g., inputs from the viewer) and/or the physics of the virtual 3D environment may cause the state of the virtual 3D environment to change. As just one example, in response to a viewer initiating a reel-spin of a virtual reel-spinning machine, the virtual reels may begin to rotate. As another example, in response to the one or more of the virtual reels stopping on a symbol that matches a payline on which the viewer wagered, one or more virtual light sources of the virtual reel-spinning machine may be activated.

In steps 640-670, a view depicting the virtual 3D environment in its determined state may be generated. Steps 640-670 may be repeated to generate multiple views of the virtual 3D environment from different viewpoints.

In step 640, a viewpoint for a view of the virtual 3D environment may be determined. In some embodiments, a user may control the viewpoint from which the virtual 3D environment is depicted using a tactile input device (e.g., a touch screen, keypad, keyboard, mouse, etc.) or by issuing commands through a voice-activated user interface, such that the viewpoint from which the virtual 3D environment is depicted is not responsive to the position of the user's head or eyes. In some embodiments, movement of the user's head and/or eyes may be tracked, and the viewpoint from which the virtual 3D environment is depicted may be determined based, at least in part, on the position of the user's head and/or eyes. In some embodiments, the viewpoint from which the virtual 3D environment is depicted may correspond to the viewpoint from which the user views a 3D display device displaying 3D images of the virtual 3D environment.

In step 650, textures may be applied to surfaces of virtual objects in the virtual 3D environment. For some virtual objects, different images may be applied to a surface of the virtual object as textures of the surface in views depicting the virtual 3D environment from different viewpoints. For some virtual objects, the image applied to a surface of the virtual object as a texture of the surface may depend on the viewpoint of the view being generated. In some embodiments, this "multi-texture technique" may provide more realistic 3D images of the virtual 3D environment at lower computational expense, relative to conventional techniques for generating 3D images. In some embodiments, this multi-texture technique may be applied to any suitable surface of any suitable virtual object in the virtual 3D environment, including static surfaces (e.g., surfaces that do not move) and/or dynamic surfaces (e.g., surfaces that move).

As just one example, when generating a first view 500 of a main portion of a virtual reel-spinning machine, a first image (e.g., an image depicting panel 440 of a main portion 400 of a mechanical reel-spinning machine from a first viewpoint) may be applied to the surface of virtual panel 540 as a first texture of the virtual panel's surface in the first view. When generating a second view of a main portion of a virtual reel-spinning machine, a second image (e.g., an image depicting panel 440 of a main portion 400 of a mechanical reel-spinning machine from a second viewpoint) may be applied to the surface of virtual panel 540 as a second texture of the virtual panel's surface in the second view.

For some virtual objects, the same image may be applied to a surface of the virtual object as a texture of the surface in views depicting the 3D virtual environment from different viewpoints. In some embodiments, this "single-texture technique" may be applied to any suitable surface of any suitable virtual object in the virtual 3D environment, including dynamic surfaces and/or static surfaces. For example, when generating views of a virtual reel-spinning machine, this single-texture technique may be used to apply textures to surfaces of virtual reels 510, virtual meter area 520, and/or virtual message component 530.

As just one example, when generating multiple views of a main portion of a virtual reel-spinning machine, the same image may be applied to the surface of a virtual reel 510 as a texture of the virtual reel's surface in multiple views of the virtual reel 510. In some embodiments, the same image may be applied as the virtual reel's surface texture in left-eye and right-eye views which form a stereoscopic image of the virtual reel-spinning machine. In some embodiments, the same image may be applied as the virtual reel's surface texture in multiple views which depict the virtual reel-spinning machine from multiple, different viewpoints.

In some embodiments, the image applied as the virtual reel's surface texture may comprise a strip of symbols. In some embodiments, the image of the strip of symbols may be acquired from or provided by a purchaser, prospective purchaser, operator, prospective operator, user, prospective user, and/or manufacturer of a casino game machine adapted to display 3D images of the virtual reel-spinning machine.

In some embodiments, the orientation of the virtual reel during or after a virtual reel spin may be part of the state of the virtual reel-spinning machine, and may be determined in step 630 of method 600. In some embodiments, the portion of the virtual reel's surface texture (e.g., the portion of the strip of symbols) that is visible in a 3D image of the virtual reel-spinning machine may be determined based, at least in part, on the orientation of the virtual reel.

As another example, when generating multiple views of a main portion of a virtual reel-spinning machine, the same image may be applied to the surface of a virtual meter area 520 as a texture of the virtual meter area's surface in views depicting the virtual meter area from different viewpoints. In some embodiments, the same image may be applied as the virtual meter area's surface texture in left-eye and right-eye views which form a stereoscopic image of the virtual reel-spinning machine. In some embodiments, the same image may be applied as the virtual meter area's surface texture in multiple views which depict the virtual reel-spinning machine from different viewpoints.

In some embodiments, the image applied as the virtual meter area's surface texture may comprise text and/or symbols indicative of a viewer's wager(s), credits, winnings, and/or losses. In some embodiments, the viewer's wager(s), credits, winnings, and/or losses may be part of the state of the virtual reel-spinning machine, and may be determined at step 630 of method 600. In some embodiments, the text and/or symbols included in the virtual meter area's surface texture may be generated based, at least in part, on a model and/or a state of the virtual reel-spinning machine.

As another example, when generating multiple views of a main portion of a virtual reel-spinning machine, the same image may be applied to the surface of a virtual message component 530 as a texture of the virtual message component's surface in views depicting the virtual message component from different viewpoints. In some embodiments, the same image may be applied as the virtual message component's surface texture in left-eye and right-eye views which form a stereoscopic image of the virtual reel-spinning machine. In some embodiments, the same image may be applied as the virtual message component's surface texture in multiple views which depict the virtual reel-spinning machine different viewpoints.

In some embodiments, the image applied as the virtual message component's surface texture may comprise text and/or symbols indicative of a message of encouragement, an instructive message, a congratulatory message, a descriptive message, and/or any other suitable message. In some embodiments, the message may be part of the state of the virtual reel-spinning machine, and may be determined at step 630 of method 600. In some embodiments, the text and/or symbols included in the virtual message component's surface texture may be generated based, at least in part, on a model and/or a state of the virtual reel-spinning machine.

In step 660, lighting effects may be applied to the virtual 3D environment. In some embodiments, lighting effects may be applied to the virtual 3D environment by modeling activation/inactivation of virtual light sources and/or by modeling virtual reflections.

In some embodiments, activation and/or inactivation of virtual light sources in a virtual 3D environment may be modeled using differential illumination information derived from 2D images of light sources in active and inactive states. The light sources depicted in the 2D images may, in some embodiments, be disposed in a real-world environment corresponding to the virtual 3D environment. For example, activation and/or inactivation of virtual light sources in a virtual reel-spinning machine may be modeled using differential illumination information derived from 2D images of a mechanical reel-spinning machine's light sources in active and inactive states. Some embodiments of techniques for obtaining differential illumination information and using the differential illumination information to model virtual light sources are described below.

In some embodiments, differential illumination information may be generated by subtracting an image of an environment with a light source in an inactive state from an image of the environment with the light source in an active state. The images of the environment may depict the environment from the same viewpoint. The result of the subtraction operation may be a differential image of the environment, from the same viewpoint, in which the value of each pixel is equal to the difference between the pixel's value with the light source in the active state and the pixel's value with the light source in the inactive state. In some embodiments, the image of the environment with the light source in the active state may be reproduced by adding the differential image to the image of the environment with the light source in the inactive state.

In some embodiments, differential illumination information comprises information contained in one or more differential images of the environment. The differential illumination information may include, without limitation, information indicating the color values (e.g., RGB values), transparency values, and/or brightness values of pixels in the differential image(s). In some embodiments, differential images depicting the environment from multiple, different viewpoints may be obtained. In some embodiments, differential images corresponding to different lighting states of the environment may be obtained. In some embodiments, a differential image may contain differential illumination information corresponding to a single light source (e.g., the differential image may be obtained using two images of the environment which differ only in the activation state of the single light source). In some embodiments, a differential image may contain differential illumination information corresponding to multiple light sources (e.g., the differential image may be obtained using two images of the environment which differ in the activation states of two or more light sources).

Differential images corresponding to any suitable initial and final lighting states of the environment may be obtained from any suitable number of viewpoints. In some embodiments, a comprehensive set of differential images corresponding to all pairs of initial and final lighting states of the environment may be obtained from all viewpoints of interest. In other words, for an environment in which there are N lighting states $LS_1 \ldots LS_N$ and V viewpoints of interest, differential images corresponding to the difference between each pair of lighting states LS may be obtained from each viewpoint. However, even for an environment with a small number of light sources N, each of which has only a small number of states (e.g., 2 states), the number of lighting states for the environment may be large ($2^N$), the number of pairs of lighting states may be even larger: $(2^N)*(2^N-1)/2$, and the number of pairs of lighting states for all viewpoints of interest may be larger still: $V*(2^N)*(2^N-1)/2$.

In some embodiments, a sparse set of differential images may be obtained as follows. For each individual light source, a differential image may be obtained by subtracting an image of the environment in which all the light sources are inactive from an image of the environment in which the individual light source (and only the individual light source) is active. One such differential image may be obtained for each individual light source from each viewpoint of interest. The total number of differential images generated using this approach may be much smaller: V*N. In some embodiments, the differential illumination information corresponding to the sparse set of differential images may be sufficient to model a transition from any first lighting state of the virtual 3D environment to any second lighting state of the virtual 3D environment.

In some embodiments, a differential image associated with a first light source may be obtained by subtracting an image of an environment in which no light sources are active from an image of the environment in which the first light source is the only active light source. In some embodiments, a differential image associated with a first light source may be obtained by subtracting a first image of an environment from a second image of the environment, where the first light source is active in the second image and inactive in the first image, and where all other light sources have the same activation state in the two images.

In some embodiments, differential illumination information pertaining to light sources 450 of a main portion 400 of a mechanical reel-spinning machine may be obtained. For example, a first image of the mechanical reel-spinning machine may be obtained in which all the light sources 450 are inactive, and a second image of the mechanical reel-spinning machine may be obtained in which a first of the light sources (e.g., light source 450*a*) is active. The first image may be subtracted from the second image to obtain differential illumination information corresponding to the first light source, from the viewpoint of the first and second images. This process may be repeated from different viewpoints and for different light sources to obtain differential illumination information relating to a plurality of the light sources 450 (e.g., all of the light sources 450) from a variety of viewpoints.

In some embodiments, the differential illumination information pertaining to one or more light sources of an environment may be used to apply lighting effects to a corresponding virtual 3D environment. Such lighting effects may include, without limitation, activating and inactivating virtual light sources in the virtual 3D environment, adjusting attributes of the light produced by virtual light sources in the virtual 3D environment (e.g., the intensity, brightness, color, and/or whiteness of the light), and/or using the light produced by the virtual light sources to form patterns.

In some embodiments, differential illumination information may be used to model activation of a virtual light source in a virtual 3D environment. In some embodiments, a view of a virtual 3D environment in which a first virtual light source is active may be obtained by adding a differential image to the view of the virtual 3D environment. In some embodiments, the differential image may depict differential illumination information associated with a light source which corresponds to the first virtual light source. In some embodiments, the differential image may be derived, using any suitable technique, from images of an environment that corresponds to the virtual 3D environment. In some embodiments, the differential image's viewpoint of the corresponding environment may substantially match the view's viewpoint of the virtual 3D environment.

For example, the virtual 3D environment may include a virtual reel-spinning machine with a virtual light source 550*a*, and the corresponding environment may include a mechanical reel-spinning machine similar in appearance and function to the virtual reel-spinning machine, with a corresponding light source 450*a*. To generate a view of the virtual reel-spinning machine in which virtual light source 550*a* is active, a differential image associated with virtual light source 550*a* may be added to a view of the virtual 3D environment.

In some embodiments, differential illumination information may be used to model inactivation of a virtual light source in a virtual 3D environment. In some embodiments, a view of a virtual 3D environment in which a first virtual light source is inactive may be obtained by subtracting a differential image associated with a corresponding light source from a view of the virtual 3D environment in which the first virtual light source is active.

In some embodiments, differential illumination information may be used to model activation and/or inactivation (e.g., simultaneous activation and/or inactivation) of multiple virtual light sources in a virtual 3D environment. In some embodiments, views of a virtual 3D environment in which various first virtual light sources are active and various second virtual light sources are inactive may be obtained by adding differential images associated with light sources corresponding to the first virtual light sources to views of the virtual 3D environment, and by subtracting differential images associated with light sources corresponding to the second virtual light sources from views of the virtual 3D environment, as appropriate. In this way, a lighting state of the virtual 3D environment may be modeled even in cases where no single differential image corresponding to the lighting state is available.

In some embodiments, differential illumination information may be used to adjust attributes of the light produced by virtual light sources in a virtual 3D environment (e.g., the intensity, brightness, color, and/or whiteness of the light). The intensity and/or brightness of a pixel may be determined by the pixel's value (e.g., RGB value), and the intensity and/or brightness of a group of pixels may be determined by the values of the pixels that make up the group. In some embodiments, the brightness and/or intensity of the light provided by a virtual light source in a virtual 3D environment may be adjusted by selectively applying differential illumination information to subsets of the pixels in a view of the virtual 3D environment. In some embodiments, the brightness and/or intensity of the light provided by a virtual light source in a view of the virtual 3D environment may be increased by adding a plurality of the pixels of a differential image to the view. The differential image may be associated with a light source corresponding to the virtual light source. Any suitable plurality of pixels of the differential image may be used, including, without limitation, all the pixels, three-quarters of the pixels, half the pixels, or one-quarter of the pixels. In some embodiments, the selected pixels may be uniformly distributed throughout the differential image, roughly evenly distributed throughout the differential image, randomly distributed throughout the differential image, and/or distributed in any other suitable arrangement. In some embodiments, the increase in the brightness and/or intensity of the light provided by the light source may be proportional to the percentage of the differential image's pixels that are added to the view. Likewise, the brightness and/or intensity of the light provided by a virtual light source in a view of the virtual 3D environment may be decreased by subtracting a plurality of the pixels of a suitable differential image from the view.

In some embodiments, the brightness and/or intensity of the light provided by a virtual light source may be gradually increased and/or decreased over time to model a dimmer control for the light source. In some embodiments, the brightness and/or intensity of the light provided by a light source may be randomly increased and/or decreased over time to model flickering of the light source (e.g., the flickering of a neon lamp). In some embodiments, the adjustments in the brightness and/or intensity of a flickering virtual light source's light, and the durations between successive adjustments, may be determined using values generated by a random number generator.

In some embodiments, differential illumination information may be used to adjust the color and/or whiteness of the light provided by a virtual light source. The color and/or whiteness of a pixel may be determined by the pixel's value (e.g., RGB value), and the color and/or whiteness of a group of pixels may be determined by the values of the pixels that make up the group. In some embodiments, the color and/or whiteness of the light provided by a virtual light source in a virtual 3D environment may be adjusted by adjusting the pixel values of a differential image before combining the differential image with a view of the virtual 3D environment (e.g., adding the differential image to the view or subtracting the differential image from the view). In some embodiments, the color adjustments may be applied only to pixels that were not black in the original differential illumination information, because the black pixels may represent portions of the virtual 3D environment that are not lit by the virtual light source. In some embodiments, the pixel colors may be adjusted in a predetermined sequence to create a color cycling effect. In some embodiments, adjustments to the color of the light provided by a virtual light source may be used to model multi-color virtual light sources and/or the application of virtual color filters to the virtual light sources.

In some embodiments, differential illumination information may be used to create patterns from the light produced by virtual light sources. In some embodiments, a pattern may be formed in a view of virtual 3D environment by adjusting the transparency values of selected pixels in a differential image before adding the differential image to the view. The selected pixels may form any suitable pattern, including, without limitation, a star, particle glitter, and/or a light sweep.

In some embodiments, ray tracing techniques may be used to apply lighting effects to views of a virtual 3D environment. Ray tracing may incur more computational expense than some embodiments of the techniques for applying lighting effects based on differential illumination information.

In some embodiments, the lighting effects applied to the virtual 3D environment may include modeling of reflections. In some embodiments, reflections of light from reflective surfaces of the virtual 3D environment may be modeled. The modeled reflections may include reflections of light provided by virtual light sources in the virtual 3D environment and/or reflections of light provided by real-world light sources external to the virtual 3D environment.

In some embodiments, the reflection of a viewer's face and/or body on one or more surfaces of the virtual 3D environment may be modeled, such that the reflection of the viewer's face and/or body is visible in a 3D image of the virtual 3D environment. In some embodiments, the viewer's reflection may be modeled using the following technique. The viewer's image may be captured using a camera, including, but not limited to, a video camera. The camera may be disposed on or integrated with the device that displays the 3D images of the virtual 3D environment. The viewer's position and/or movement may be tracked using any suitable position-tracking and/or motion-tracking technology. Reflections of the viewer's face and/or body from the surfaces of the virtual 3D environment may be determined based on the captured image of the viewer, the viewer's position, and the model of the virtual 3D environment. The surface textures of the appropriate surfaces may be altered to show an appropriate reflection of the viewer.

In step 670, a view of the virtual 3D environment in the determined state and with the applied textures and lighting effects may be generated, with the view depicting the virtual 3D environment from the determined viewpoint. In step 675, a determination is made as to whether all desired views of the virtual 3D environment have been generated. If not, steps 640-670 may be repeated to generate another view depicting the virtual 3D environment from a different viewpoint.

If all desired views of the virtual 3D environment have been generated, some embodiments of method 600 may perform steps 680 and 690. In step 680, a 3D image including two or more of the generated views may be generated, and in step 690, the 3D image may be displayed. As discussed above, the 3D image may be generated and displayed using any suitable technique. In some embodiments, a stereoscopic 3D image may be generated, and the stereoscopic 3D image may be displayed using an active 3D viewer, a passive 3D viewer, and/or an autostereoscopic display device. In some embodiments, the autostereoscopic display device may be part of a 3D TV, a head-mounted display (HMD), a mobile computing device (e.g., smartphone, tablet, laptop, etc.), and/or a casino game machine cabinet.

Any suitable autostereoscopic display technique may be used. Some autostereoscopic display techniques are described below with reference to FIGS. 11-12. In some embodiments, a stereoscopic image comprising a left-eye view and a right-eye view of the virtual 3D environment may be displayed. (A left-eye view and a right-eye view of a 3D environment may depict the 3D environment from the viewpoints of a left eye and a right eye, respectively.) In some embodiments, the left-eye view may be displayed in a first single, fixed viewing zone and the right-eye view displayed in a second single, fixed viewing zone. In some embodiments, the left-eye view and the right-eye view may each be displayed in multiple fixed viewing zones.

In some embodiments, the position of the viewer's head and/or eyes may be tracked, and the left-eye and right-eye views may be displayed in dynamic viewing zones. In some embodiments, the dynamic viewing zones may be adjusted as the viewer's head and/or eyes move, such that the viewer's left eye remains in the left-eye zone and the reviewer's right eye remains in the right-eye zone, even as the viewer's position changes. In some embodiments, the position of the viewer's head and/or eyes may be tracked using any suitable technique, including head-tracking techniques and/or eye-tracking techniques. In some embodiments, the positions of multiple viewers' heads and/or eyes may be tracked, and the left-eye and right-eye views may be displayed in dynamic viewing zones such that each viewer's left eye remains in a left-eye zone and each viewer's right eye remains in a right-eye zone, even as the viewers' positions change.

In some embodiments, a stereoscopic image comprising three or more different views of the virtual 3D environment may be generated and displayed. In some embodiments, the three or more different views may be displayed, respectively, in three or more fixed viewing zones. In some embodiments, two viewers observing the stereoscopic image from different viewing zones may see different views depicting the virtual 3D environment from different viewpoints. In some embodiments, the multi-view stereoscopic image may provide movement parallax, such that the viewer's eyes may see the virtual 3D environment from different viewpoints as the viewer's head and/or eyes move in relation to the display device.

In some embodiments, a stereoscopic image comprising three or more different views of the virtual 3D environment may be generated, and the image may be displayed in two dynamic zones which are adjusted as the viewer's head and/or eyes move, such that the viewer's left eye remains in the first dynamic zone and the viewer's right eye remains in the second dynamic zone. In some embodiments, the views of the virtual 3D environment displayed in the first and second dynamic zones may be determined based, at least in part, on the viewer's position relative to the display device or some other point of reference. In other words, the views presented to the viewer may depict the virtual 3D environment from a viewpoint that changes in response to movement of the user (e.g., changes in the position of the viewer's head and/or eyes), thereby providing the viewer with movement parallax.

In step 695, a determination is made as to whether to generate a new 3D image. In some embodiments, new 3D images may be generated at specified times (e.g., periodically) or in response to specified events (e.g., changes in the state of the virtual 3D environment). If the determination to generate a new 3D image is made, steps 630-690 may be repeated to generate a new 3D image depicting the virtual 3D environment. Otherwise, the display device may continue to display the current 3D image.

Figure 7:
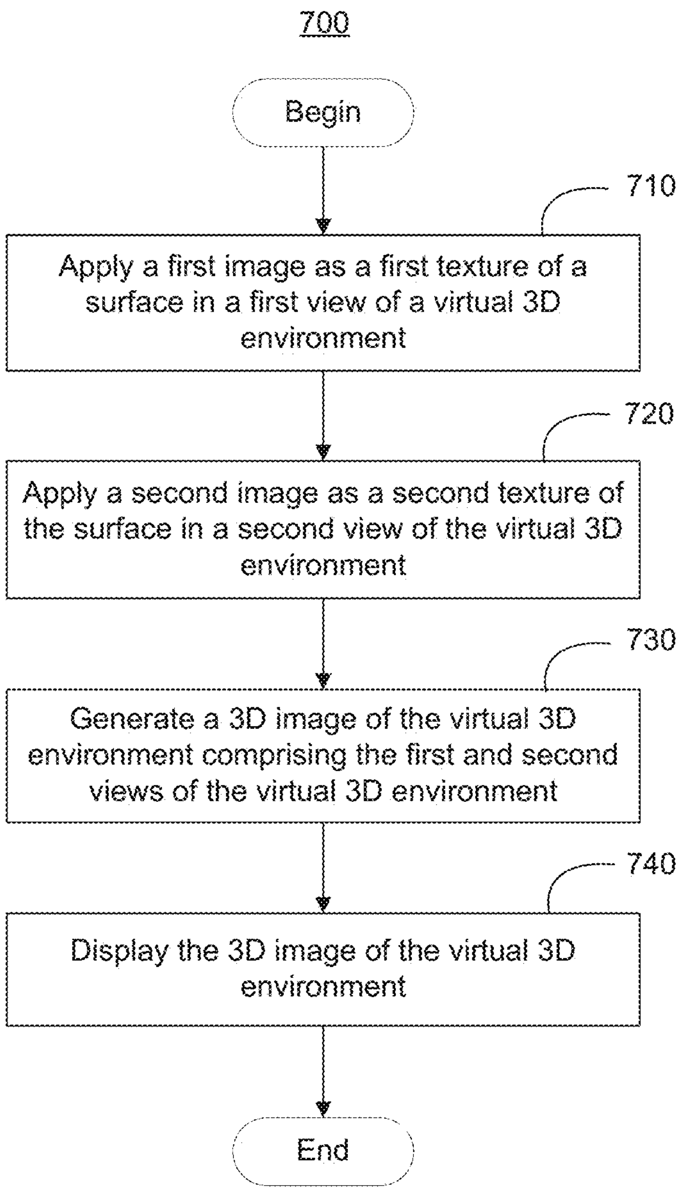
FIG. 7 is a flowchart illustrating an exemplary method of generating a 3D image of a virtual 3D environment in accordance with some embodiments.

FIG. 7 shows a method 700 of generating a 3D image of a virtual 3D environment in accordance with some embodiments. Some embodiments of method 700 may include steps 710-740. In step 710, a first image may be applied to a surface as a first texture of the surface in a first view of a virtual 3D environment. In step 720, a second image may be applied to the surface as a second texture of the surface in a second view of the virtual 3D environment. In step 730, a 3D image comprising the first and second views of the virtual 3D environment may be generated. In step 740, the 3D image of the virtual 3D environment may be displayed. Some embodiments of steps 710-740 are discussed below.

In step 710, a first image may be applied to a surface in the virtual 3D environment as a first texture of the surface, and in step 720, a second image may be applied to the surface in the virtual 3D environment as a second texture of the surface. Any suitable first and second images may be acquired using any suitable technique; some embodiments of suitable images and suitable acquisition techniques are discussed above with reference to step 620 of method 600. In some embodiments, the first and second images may be 2D images (e.g., static 2D images), and may differ from each other. In some embodiments, the first and second images may comprise (or may be derived from) images supplied by and/or selected by a purchaser, prospective purchaser, operator, prospective operator, user, prospective user, and/or manufacturer of a device configured to generate the 3D image of the virtual 3D environment.

In some embodiments, the virtual 3D environment may include a virtual casino game machine, and the surface to which the images are applied as textures may be a surface of the virtual casino game machine (e.g., a virtual panel 540 or any other suitable surface). In some embodiments, the first and second images may comprise images of a casino game machine (e.g., photographs of a real-world casino game machine, and/or wholly or partly fabricated depictions of a casino game machine). In some embodiments, the first and second images may comprise images derived from a time-varying video of a real-world casino game machine.

In step 730, a stereoscopic image comprising the first and second views of the virtual 3D environment may be generated. The stereoscopic image may depict the virtual 3D environment. Any suitable type of stereoscopic image may be generated, including, without limitation, an anaglyph image, a polarized projection, or an autostereoscopic image.

In some embodiments, the stereoscopic image may include more than two views of the virtual 3D environment, such that the viewers of the stereoscopic image may perceive movement parallax.

In some embodiments, the stereoscopic image may depict a dynamic virtual object (e.g., a virtual object which sometimes changes position or orientation in the virtual 3D environment). In some embodiments, the same image may be applied to a surface of the dynamic virtual object as a texture of the object's surface in the stereoscopic image's two or more views of the virtual 3D environment. In some embodiments, the virtual 3D environment may include a virtual casino game machine. In some embodiments, the virtual casino game machine may be a virtual reel-spinning machine. In some embodiments, the dynamic virtual object may be a component of a virtual reel-spinning machine, including, without limitation, a reel, meter area, or message component of the virtual reel-spinning machine. In some embodiments, the stereoscopic image's depiction of the dynamic virtual object may change over time. For example, in response to a player of the virtual reel-spinnning machine initiating a reel spin, a reel may rotate in the stereoscopic image.

In some embodiments, generating the stereoscopic image may involve applying lighting effects to the virtual 3D environment. Such lighting effects may include, without limitation, activating and deactivating virtual light sources in the virtual 3D environment, adjusting attributes of the light produced by virtual light sources in the virtual 3D environment (e.g., the intensity, brightness, color, and/or whiteness of the light), using the light produced by the virtual light sources to form patterns, and/or modeling virtual reflections. Any suitable lighting effects may be applied using any suitable technique; some embodiments of suitable lighting effects and suitable techniques are discussed above with reference to step 660 of method 600 and/or below with reference to FIGS. 8-10. In some embodiments, differential illumination information may be used to generate the lighting effects.

In step 740, the stereoscopic image of the virtual 3D environment may be displayed. Any suitable technique may be used to display the stereoscopic image, including, without limitation, the techniques described above with reference to step 690 of method 600. In some embodiments, the stereoscopic image may be displayed using autostereoscopic display techniques. In some embodiments, displaying the stereoscopic image may comprise displaying the first view of the virtual 3D environment in a first viewing zone of an autostereoscopic display in which a left eye of the player is positioned, and displaying the second view of the virtual 3D environment in a second viewing zone of the autostereoscopic display in which a right eye of the player is positioned. In some embodiments, displaying the stereoscopic image may comprise displaying the first view of the virtual 3D environment in a first plurality of viewing zone of an autostereoscopic display, and displaying the second view of the virtual 3D environment in a second plurality of viewing zones of the autostereoscopic display. In some embodiments, displaying the stereoscopic image may comprise displaying a third view of the virtual 3D environment in a third viewing zone (or a third plurality of viewing zones) of an autostereoscopic display. In some embodiments, the first, second, and third views of the virtual 3D environment may depict the virtual 3D environment from first, second, and third viewpoints, respectively.

In some embodiments, a second stereoscopic image of a second virtual 3D environment may be displayed by the autostereoscopic display, in parallel with the display of the first stereoscopic image of the first virtual 3D environment. In some embodiments, the first stereoscopic image of the first virtual 3D environment may be displayed in viewing zones where eyes of a first viewer are positioned, and the second stereoscopic image of the second virtual environment may be displayed in viewing zones where eyes of a second viewer are positioned. In some embodiments, the locations of the first and second viewers (e.g., the positions of the viewers' heads and/or eyes) may be tracked (e.g., using any suitable location-tracking, head-tracking, and/or eye-tracking techniques), and the autostereoscopic display may display the stereoscopic images in the viewing zones where the viewers' eyes are positioned in response to determining the viewing zones in which the viewers' eyes are positioned.

Figure 8:
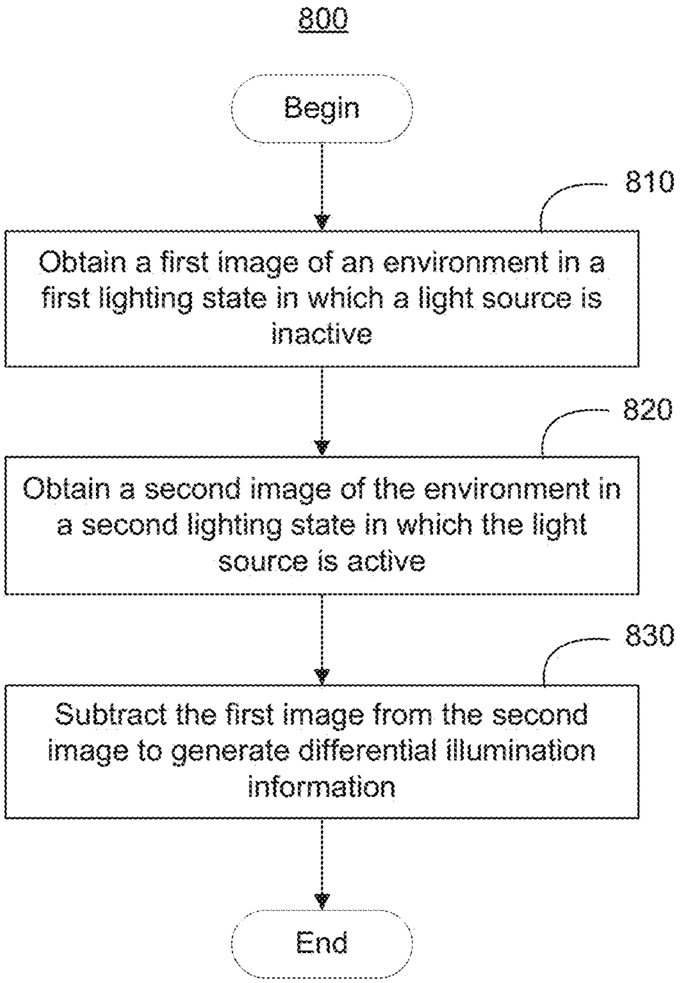
FIG. 8 is a flowchart illustrating an exemplary method of generating information regarding illumination of a virtual 3D environment in accordance with some embodiments.
Figure 9A:
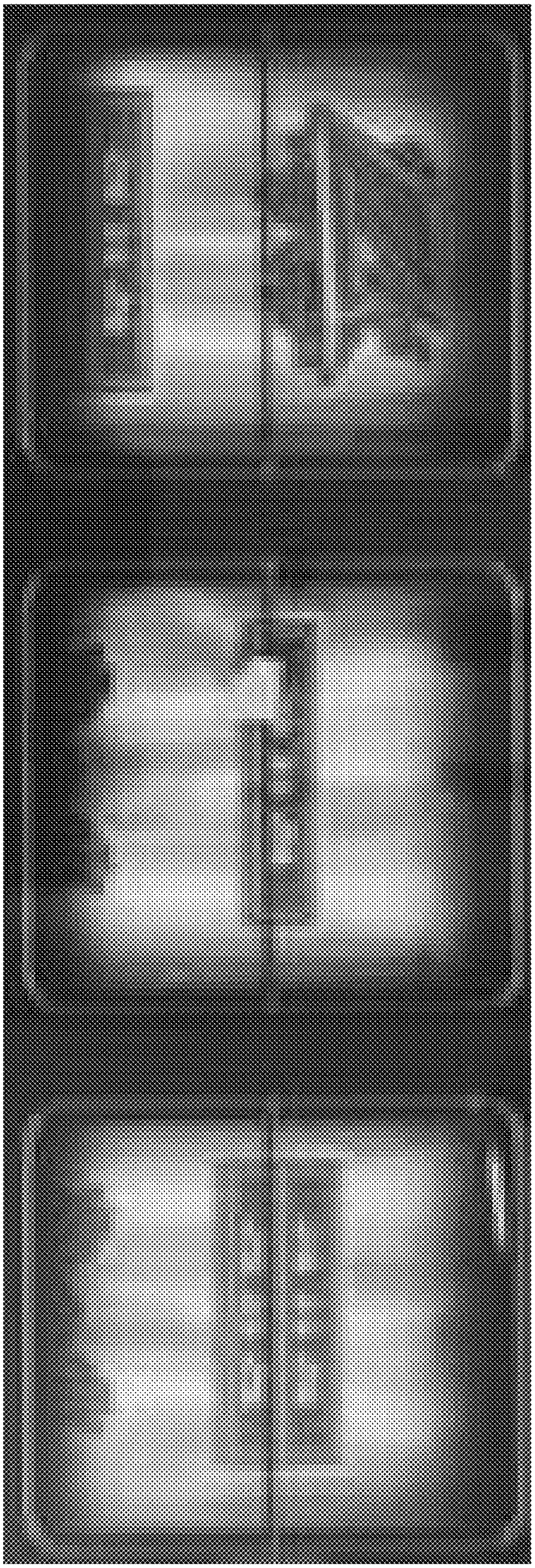
FIG. 9A is a photograph 900A illustrating a portion of a reel-spinning game machine with mechanical reels having deactivated light sources.
Figure 9B:
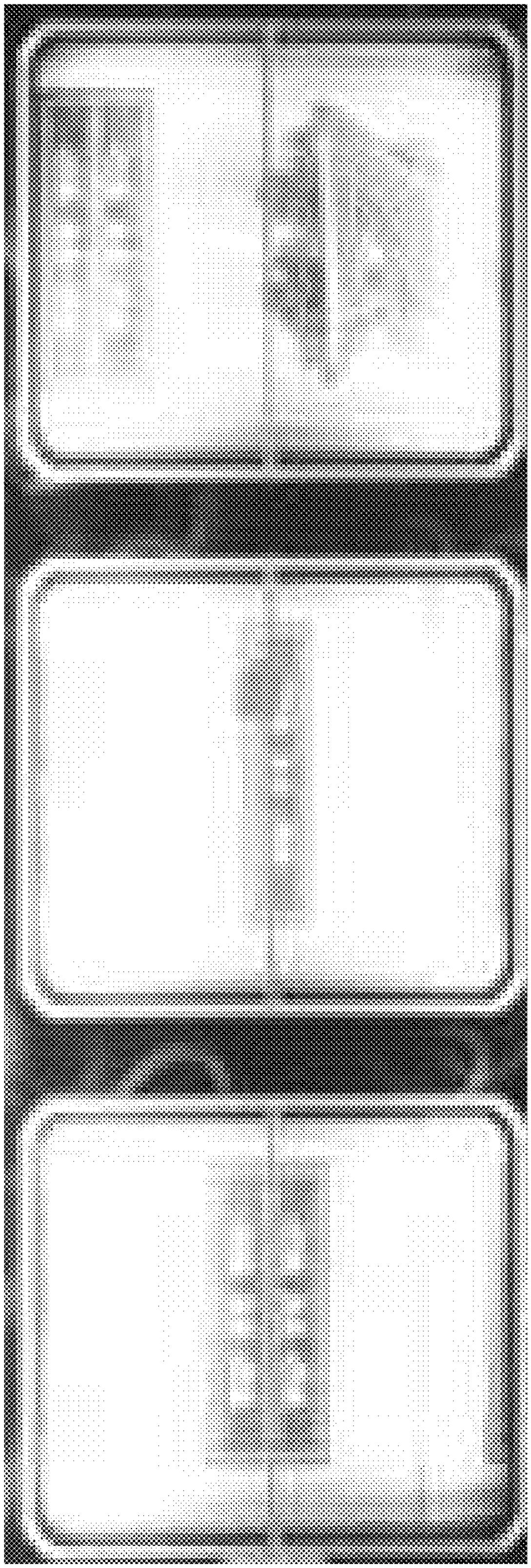
FIG. 9B is a photograph 900B illustrating a portion of a reel-spinning machine with mechanical reels having activated light sources.
Figure 9C:
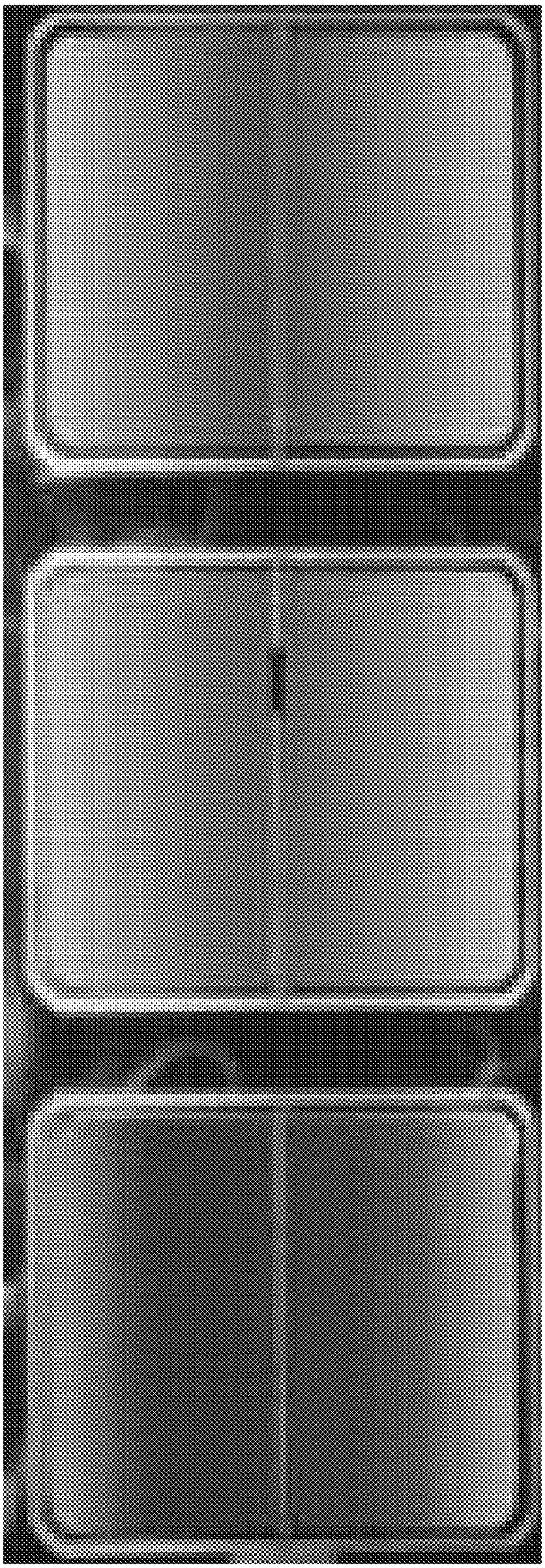
FIG. 9C is a differential image 900C illustrating differential illumination information in accordance with some embodiments.

FIG. 8 shows a method 800 of generating differential illumination information for a virtual 3D environment in accordance with some embodiments. The steps of method 800 are described below with reference to FIGS. 9A-9C. FIG. 9A shows a photograph 900A of a portion of a reel-spinning machine with mechanical reels having inactive light sources. FIG. 9B shows a photograph 900B illustrating a portion of a reel-spinning machine with mechanical reels having active light sources. FIG. 9C shows a differential image 900C illustrating differential illumination information in accordance with some embodiments. In step 810, a first image of an environment may be obtained. In some embodiments, the first image may depict the environment in a first lighting state in which one or more first light sources are inactive. In some embodiments, the first image may depict the environment from a first viewpoint. As just one example, the environment may include a reel-spinning machine, and the first image may comprise a photograph 900A of a portion of a reel-spinning machine in which the reels' light sources are inactive.

In step 820, a second image of the environment may be obtained. In some embodiments, the second image may depict the environment in a second lighting state in which the one or more first light sources are active. In some embodiments, the second image may depict the environment from the first viewpoint. As just one example, the second image may comprise a photograph 900B of a portion of a reel-spinning machine in which the reels' light sources are active.

In step 830, the first image may be subtracted from the second image to generate differential illumination information associated with the one or more first light sources. In some embodiments, the differential illumination information may comprise a differential image in which the value of each pixel is set to the difference between the values of the corresponding pixels in the second and first images. (One of ordinary skill in the art would understand that the subtraction operation may be performed so as to avoid underflow of any pixel's value below any minimum pixel value. In some embodiments, the minimum pixel value may correspond to a black-colored pixel.) In some embodiments, the differential illumination information may comprise information describing the color, brightness, and/or transparency of the pixels in the differential image. Some or all of the differential illumination information may be encoded with any suitable encoding, including, without limitation, the RGB encoding. In some embodiments, suitable image processing techniques may be applied to the differential image, and/or suitable data processing techniques may be applied to the differential illumination information, to facilitate the application of lighting effects to other images. As just one example, FIG. 9C shows a differential image 900C obtained by subtracting photograph 900A from photograph 900B.

Figure 10:
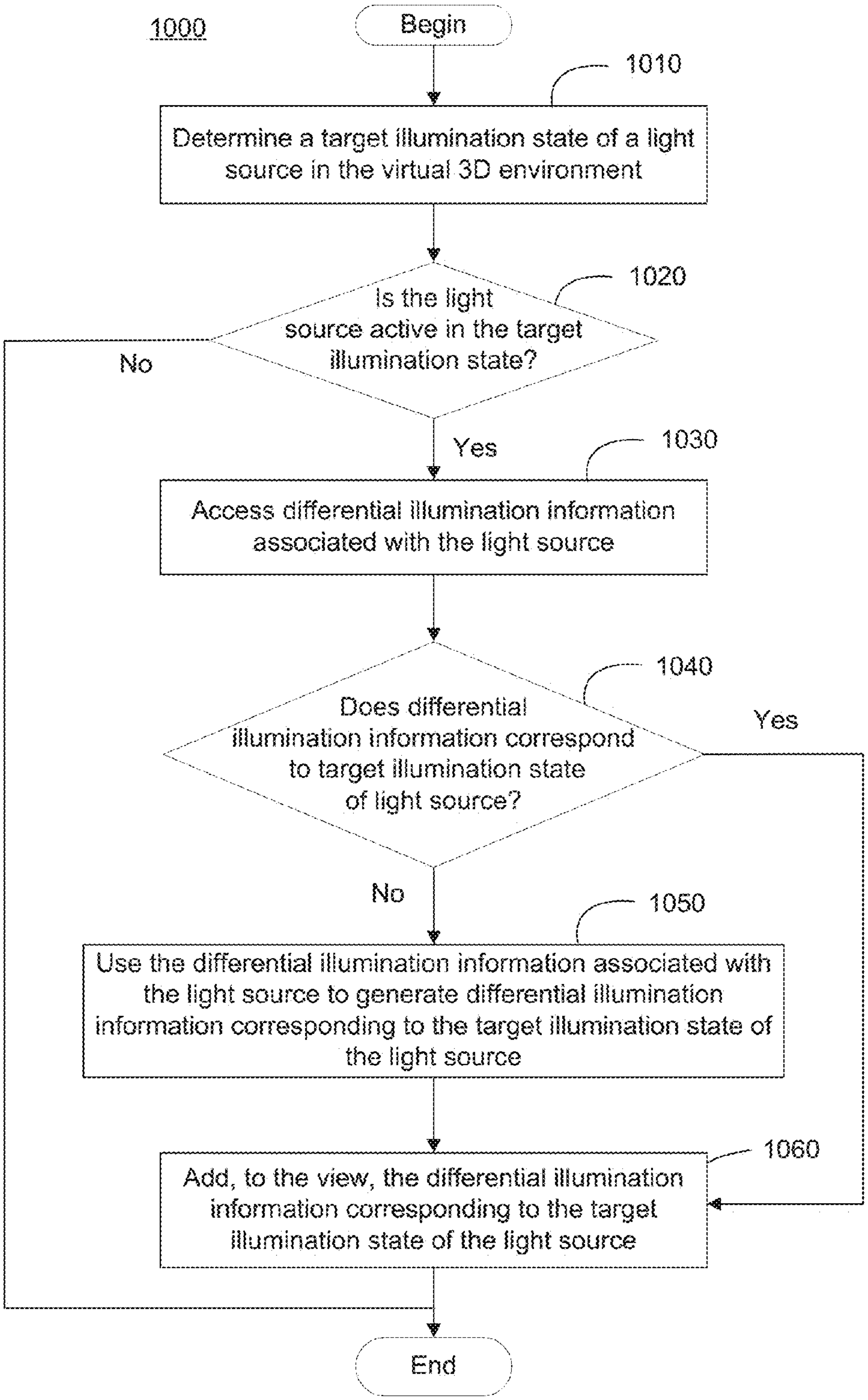
FIG. 10 is a flowchart illustrating an exemplary method of applying lighting effects to a virtual 3D environment in accordance with some embodiments.

FIG. 10 shows a method 1000 of applying lighting effects to a virtual 3D environment, in accordance with some embodiments. In step 1010, a target illumination state of a virtual light source in a virtual 3D environment may be determined. In some embodiments, the virtual light source's target illumination state may be determined based, at least in part, on a model of the virtual 3D environment and/or on inputs to the virtual 3D environment (e.g., user inputs).

In step 1020, a determination may be made as to whether the virtual light source is active in the target illumination state. If the light source is active in the target illumination state, the method may proceed to step 1030. Otherwise, the method may end.

In step 1030, differential illumination information associated with the light source may be accessed. In some embodiments, the differential illumination information may be loaded from a processor-readable storage medium.

In step 1040, a determination may be made as to whether the differential illumination information associated with the light source corresponds to the target illumination state of the light source. In some embodiments, differential illumination information associated with a light source may correspond to the target illumination state of the light source if the target illumination state of the light source is an 'active' or 'fully active' illumination state. If the differential illumination information corresponds to the light source's target illumination state, the method may proceed to step 1060. Otherwise, the method may proceed to step 1050.

In step 1050, the differential illumination information associated with the light source may be used to generate differential illumination information corresponding to the target illumination state of the light source. In some embodiments, the differential illumination information may be modified to apply lighting effects, including, without limitation, adjusting the brightness and/or intensity of the light provided by the light source, adjusting the color and/or whiteness of the light provided by the light source, causing the light source to flicker, adjusting the transparency of the pixels that display light provided by the light source, forming a pattern using the light provided by the light source, and/or any other suitable lighting effects. Some embodiments of techniques for using differential illumination information to apply lighting effects are described above with reference to step 660 of method 600.

In step 1060, the differential illumination information corresponding to the target illumination state of the light source may be added to a view of a virtual 3D environment to compose the view such that the view depicts the virtual 3D environment with the light source in the target illumination state.

In some embodiments, method 1000 may be performed for one or more (e.g., all) light sources in the virtual 3D environment. In some embodiments, method 100 may be performed for all views included in the 3D image of the virtual 3D environment.

Figure 11:
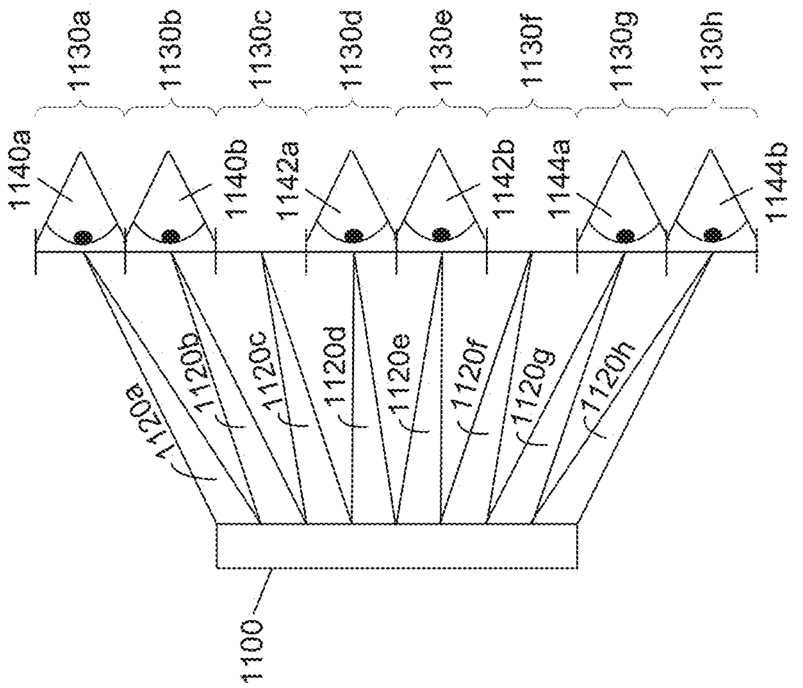
FIG. 11 is a functional sketch illustrating an autostereoscopic display with static viewing zones in accordance with some embodiments.

FIG. 11 shows an autostereoscopic display 1100 with static viewing zones 1130 in accordance with some embodiments. An autostereoscopic display may exhibit static viewing zones when the display configures fixed sets of pixels 1120 to be viewable, respectively, from fixed spatial regions (fixed "viewing zones") 1130.

In the example of FIG. 11, the pixels of display 1100 are divided into eight fixed sets 1120*a*-1120*h*, which are displayed in eight corresponding static viewing zones 1130*a*-1130*h*. In the example of FIG. 11, the pixel resolution in each viewing zone 1130 may be one-eighth of the total pixel resolution of display 1100. In the example of FIG. 11, three viewers 1140-1144 are shown viewing six fixed sets of pixels in six static viewing zones. Specifically, the right eye 1140*a* of viewer 1140 is shown viewing fixed pixel set 1120*a* in static viewing zone 1130*a*, the left eye 1140*b* of viewer 1140 is shown viewing fixed pixel set 1120*b* in static viewing zone 1130*b*, the right eye 1142*a* of viewer 1142 is shown viewing fixed pixel set 1120*d* in static viewing zone 1130*d*, the left eye 1142*b* of viewer 1142 is shown viewing fixed pixel set 1120*e* in static viewing zone 1130*e*, the right eye 1144*a* of viewer 1144 is shown viewing fixed pixel set 1120*g* in static viewing zone 1130*g*, and the left eye 1144*b* of viewer 1144 is shown viewing fixed pixel set 1120*h* in static viewing zone 1130*h*. In the example of FIG. 11, no viewers are shown viewing fixed pixel sets 1120*c* and 1120*f* in static viewing zones 1130*c* and 1130*f*.

Figure 12:
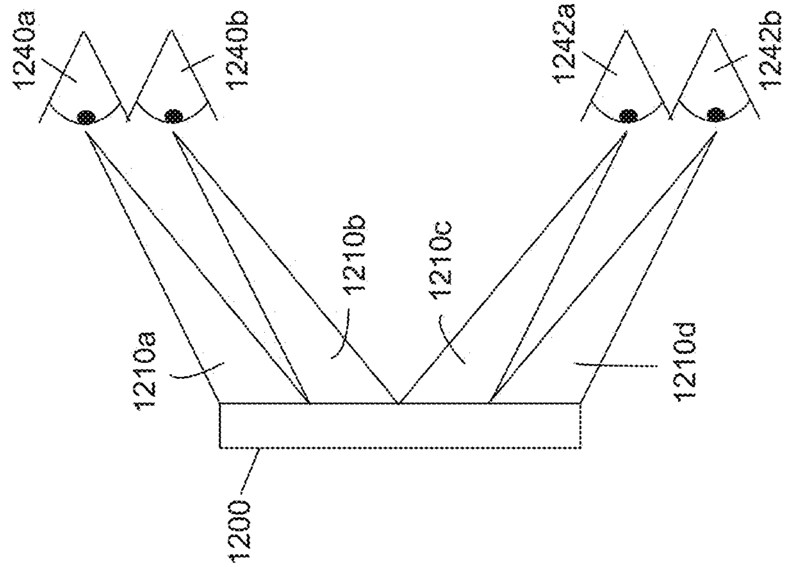
FIG. 12 is a functional sketch illustrating an autostereoscopic display with dynamic viewing zones in accordance with some embodiments.

The pixels of autostereoscopic display 1100 may be apportioned among the fixed pixel sets using any suitable technique. In some embodiments, the display's pixels may be apportioned equally among the fixed pixel sets, such that the pixel resolutions of the static viewing zones are substantially equal. In some embodiments, the display's pixels may be apportioned unequally among the fixed pixel sets, such that the pixel resolutions of at least some viewing zones may differ. In some embodiments, a parallax barrier, lenticular lens, and/or integral imaging array may be used to apportion the display's pixels among the fixed pixel sets. In some embodiments, different pixel columns or pixel rows may be apportioned to different fixed pixel sets. It should be appreciated that a division of a display's pixels into equal or unequal sets may be accomplished in any suitable way and/or pattern. For example, while FIGS. 11 and 12 illustrate different pixel sets as if they may be non-overlapping on the display, this is merely for ease of illustration in the drawings. While some exemplary embodiments may implement non-overlapping pixel sets, other exemplary embodiments may have different pixel sets that overlap, such as, for example, a left-eye set of pixels that includes every other (e.g., odd numbered) column of pixels, and a right-eye set of pixels that includes the remaining (e.g., even numbered) columns of pixels. In another example, four pixel sets may be created by allocating every fourth column (or row, or square, or any other suitable pattern) of pixels to a particular pixel set, etc. In some such embodiments, two or more different pixel sets that are projected to different viewing locations may be completely overlapping on the display screen, such that each pixel set may span substantially the full area of the display defined by the display's total array of pixels (from all pixel sets combined).

In some embodiments, autostereoscopic display 1100 may divide its pixels into any suitable number of fixed pixel sets 1120 and may display the pixel sets using any suitable number of static viewing zones 1130. In some embodiments, the number of fixed sets of pixels and the corresponding number of static viewing zones may be between 2 and 128, between 2 and 64, between 2 and 32, between 2 and 24, between 2 and 16, between 2 and 8, between 2 and 4, or 2.

In some embodiments, autostereoscopic display 1100 may display a 3D image of a 3D environment (e.g., a virtual 3D environment or a real-world 3D environment). In some embodiments, each of the fixed pixel sets 1120 may display a view of the 3D environment.

In some embodiments, autostereoscopic display 1100 may display a 3D image of a 3D environment by displaying two fixed pixel sets 1120 in two corresponding static viewing zones 1130. The fixed pixel sets may depict left-eye and right-eye views of the 3D environment, respectively. In some embodiments, a viewer may view the 3D image, with stereo parallax, by positioning the viewer's left and right eyes, respectively, in the viewing zones where the left-eye and right-eye views of the 3D environment are displayed. In other words, the autostereoscopic display may use two static viewing zones to display a single 3D image with stereo parallax.

In some embodiments, autostereoscopic display 1100 may display a 3D image of a 3D environment by displaying multiple fixed pixel sets 1120 in multiple corresponding static viewing zones 1130. In some embodiments, each of the fixed pixel sets may depict the same left-eye view or right-eye view of the 3D environment, such that a viewer may view the 3D image, with stereo parallax, by positioning the viewer's left and right eyes, respectively, in any two viewing zones where the left-eye and right-eye views of the 3D environment are displayed. In other words, the autostereoscopic display may use multiple static viewing zones to display multiple copies of the same 3D image with stereo parallax.

In some embodiments, the autostereoscopic display 1100 with multiple fixed pixel sets 1120 and multiple corresponding static viewing zones 1130 may display a 3D image with stereo parallax and coarse-grained movement parallax. In some embodiments, each of the fixed pixel sets may depict a different view of the 3D environment, such that a viewer observing the 3D image from different viewing zones may see different views depicting the 3D environment from different viewpoints. In some embodiments, the number of different views displayed by display 1100 may be limited by the number of static viewing zones. Thus, the coarseness of the 3D image's movement parallax may be determined by the number of static viewing zones, and may improve as the number of static viewing zones increases.

In some embodiments, the autostereoscopic display 1100 with multiple fixed pixel sets 1120 and multiple corresponding static viewing zones 1130 may display a 3D image with stereo parallax and fine-grained movement parallax. The fine-grained movement parallax may be achieved by adjusting the view displayed in a static viewing zone based on the position of the viewer's eye within the static viewing zone. In some embodiments, eye-tracking techniques may be used to determine the position of the viewer's eye within the static viewing zone (e.g., the location of the viewer's pupil relative to the left-side and right-side boundaries of the static viewing zone in which the viewer's eye is located). For example, eye-tracking techniques may be used to determine the position of the viewer's right eye 1140*a* within static viewing zone 1130*a*. In some embodiments, in response to a change in the position of the viewer's eye within a static viewing zone, the autostereoscopic display may make a corresponding adjustment to the viewpoint of the view displayed in that static viewing zone. For example, as the position of eye 1140*a* changes within static viewing zone 1130*a*, display 1100 may adjust the viewpoint of the view displayed by fixed pixel set 1120*a*. Thus, rather than observing movement parallax only when moving between viewing zones, the viewer may experience movement parallax even when moving within a viewing zone. In some embodiments, this technique may yield fine-grained movement parallax.

In some embodiments, autostereoscopic display 1100 may use different fixed pixel sets 1120 to simultaneously display views of different 3D environments. For example, display 1100 may use fixed pixel sets 1120*a*-1120*b* to display views of a first 3D environment to viewer 1140, while also using fixed pixel sets 1120*g*-1120*h* to display views of a second 3D environment to viewer 1144. Any suitable number of different 3D environments may be displayed in any suitable number of static viewing zones 1130 using any suitable number of fixed pixel sets 1120. Any suitable 3D environments may be simultaneously displayed. In some embodiments, the different 3D environments may comprise different virtual 3D casino gaming machines. In some embodiments, the different 3D environments may comprise different virtual 3D regions within a multi-player video game. In some embodiments, different 3D environments may be assigned to different viewing zones 1130, such that a viewer may view different 3D environments by moving among the different viewing zones. In some embodiments, different 3D environments may be assigned to different viewers, such that a first viewer may continue to view a first 3D environment (with or without movement parallax) as the first viewer moves among the different viewing zones, and a second viewer may continue to view a second 3D environment (with or without movement parallax) as the second viewer moves among the different viewing zones. In some embodiments, viewers' locations may be tracked (e.g., using head-tracking techniques, location-tracking techniques, and/or any other suitable tracking techniques), and display 1100 may determine which 3D environment is displayed in a static viewing zone 1130 based on which viewer is present in static the viewing zone.

FIG. 12 shows an autostereoscopic display 1200 with dynamic viewing zones in accordance with some embodiments. An autostereoscopic display may exhibit dynamic viewing zones when the display dynamically configures different sets of pixels 1210 to be viewable, respectively, from different spatial regions (different "viewing zones"). In contrast to an autostereoscopic display 1100 with static viewing zones, which may 'waste' some pixels by allocating those pixels to static viewing zones in which no viewers are present (see, e.g., pixel sets 1120*c* and 1120*f* and static viewing zones 1130*c* and 1130*f* in FIG. 11), autostereoscopic display 1200 may dynamically allocate pixels to viewing zones in which viewers are present. In some embodiments, the use of dynamic viewing zones may tend to improve the pixel resolution in each viewing zone by reducing or eliminating the number of 'wasted' pixels.

In the example of FIG. 12, two viewers 1240 and 1242 are shown viewing an autostereoscopic display 1200, which is configured to use dynamic viewing zones. In the example of FIG. 12, the pixels of display 1200 are divided into four sets 1210*a*-1210*d*, which are displayed in four dynamic viewing zones determined by the locations of the viewers' eyes. Specifically, the right eye 1240*a* of viewer 1240 is shown viewing pixel set 1210*a* in a dynamic viewing zone, the left eye 1240*b* of viewer 1240 is shown viewing pixel set 1210*b* in a dynamic viewing zone, the right eye 1242*a* of viewer 1242 is shown viewing pixel set 1210*c* in a dynamic viewing zone, and the left eye 1242*b* of viewer 1242 is shown viewing pixel set 1210*d* in a dynamic viewing zone. In some embodiments, in response to detecting a number of viewers N, display 1200 may apportion the pixels among the N viewers by dividing the pixels into 2N viewing zones (two viewing zones per viewer).

In some embodiments, autostereoscopic display 1200 may track the locations of viewers using any suitable tracking technique (e.g., any suitable position-tracking technique, head-tracking technique, and/or eye-tracking technique). In some embodiments, autostereoscopic display 1200 may use the tracking information to determine the locations of the viewers' heads and/or eyes.

In some embodiments, autostereoscopic display 1200 may track the identities of viewers using any suitable identity-tracking technique. In some embodiments, tracking a viewer's identity may comprise assigning the viewer an identification device and tracking the location of the identification device. In some embodiments, the identification device may include an identification code. Any suitable identification device may be used, including, without limitation, an RFID tag or a smart card. In some embodiments, the location of an identification device may be correlated with the location of a viewer to determine the viewer's identity. In some embodiments, tracking a viewer's identity may comprise using facial recognition techniques to identify the viewer and/or distinguish among the viewers.

The pixels of autostereoscopic display 1200 may be apportioned among the dynamic viewing zones using any suitable technique. In some embodiments, the display's pixels may be apportioned equally among the current viewing zones, such that the pixel resolutions of each dynamic viewing zone at any given time are substantially equal. In some embodiments, the display's pixels may be apportioned unequally among the dynamic viewing zones, such that the pixel resolutions of coexisting viewing zones may differ. In some embodiments, a parallax barrier, lenticular lens, and/or integral imaging array may be used to apportion the display's pixels among the viewing zones. In some embodiments, different pixel columns or pixel rows may be apportioned to different viewing zones.

In some embodiments, autostereoscopic display 1200 may display a 3D image of a 3D environment (e.g., a virtual 3D environment or a real-world 3D environment) to a viewer by displaying left-eye and right-eye views of the 3D environment in two viewing zones corresponding to the viewer's two eyes. In some embodiments, in response to a change in the viewer's position, display 1200 may adjust the locations of the viewing zones in accordance the locations of the viewer's eyes, without changing the views presented in the viewing zones. In other words, the autostereoscopic display may use two dynamic viewing zones to display a 3D image to a viewer with stereo parallax.

In some embodiments, autostereoscopic display 1200 may display 3D images of a 3D environment to a viewer by displaying first and second views of the 3D environment in two viewing zones corresponding to the viewer's two eyes. In some embodiments, in response to a change in the viewer's position, display 1200 may adjust the locations of the viewing zones in accordance with the locations of the viewer's eyes, and change the viewpoints of the views presented in the viewing zones. In other words, the autostereoscopic display may use two dynamic viewing zones to display a 3D image to a viewer with stereo parallax and movement parallax.

In some embodiments, autostereoscopic display 1200 may display a 3D image of a 3D environment to multiple viewers by displaying left-eye and right-eye views of the 3D environment in viewing zones corresponding to the viewers' eyes. In some embodiments, in response to a change in a viewer's position, display 1200 may adjust the locations of the corresponding viewing zones in accordance with the locations of the viewer's eyes, without changing the views presented in the viewing zones. In other words, the autostereoscopic display may use multiple dynamic viewing zones to display a 3D image to multiple viewers with stereo parallax.

In some embodiments, autostereoscopic display 1200 may display 3D images of a 3D environment to multiple viewers by displaying multiple views of the 3D environment in multiple viewing zones corresponding to the viewers' eyes. In some embodiments, in response to a change in a viewer's position, display 1200 may adjust the locations of the corresponding viewing zones in accordance with the locations of the viewer's eyes, and change the viewpoints of the views presented in the viewing zones. In other words, the autostereoscopic display may use multiple dynamic viewing zones to display 3D images to multiple viewers with stereo parallax and movement parallax.

In some embodiments, autostereoscopic display 1200 may simultaneously display views of different 3D environments. For example, display 1200 may use pixel sets 1210*a*-1210*b* to display views of a first 3D environment to viewer 1240, while also using pixel sets 1210*c*-1210*d* to display views of a second 3D environment to viewer 1242. Any suitable number of different 3D environments may be displayed in any suitable number of dynamic viewing zones using any suitable number of dynamic pixel sets 1210. Any suitable 3D environments may be simultaneously displayed. In some embodiments, the different 3D environments may comprise different virtual 3D casino gaming machines. In some embodiments, the different 3D environments may comprise different virtual 3D regions within a multi-player video game.

In some embodiments, different 3D environments may be assigned to different viewers, such that a first viewer may continue to view a first 3D environment (with or without movement parallax) as the first viewer changes position, and a second viewer may continue to view a second 3D environment (with or without movement parallax) as the second viewer changes position. In some embodiments, display 1200 may determine which 3D environment is displayed in a dynamic viewing zone based on which viewer is present in the dynamic viewing zone.

It should thus be appreciated that in some embodiments, a display of a wagering gaming apparatus may be configured such that different subsets of its pixels are made visible to different players occupying different viewing zones in front of the display. For example, a first set of pixels of the display may be made visible to a first player in a first viewing zone to the left of the midline of the display, while a second set of pixels may be made visible to a second player in a second viewing zone to the right of the midline of the display. However, this is merely an example; viewing zones may be established in any suitable physical locations around a display, and embodiments are not limited to any particular number or physical configuration of viewing zones. The first set of pixels visible in the first viewing zone may not be visible in the second viewing zone, and vice versa. In some embodiments, the display may have an array of pixels that defines the full area of the display, and each subset of pixels that is viewable in a particular viewing zone may span substantially the full area of the display. The pixels may be divided in any suitable way to produce subsets that each span substantially the full area of the display. For instance, in one example the columns of pixels in the display may be apportioned alternatingly, such that every other column of pixels (e.g., all odd-numbered columns) belong to the first set of pixels visible in the first viewing zone, and the remaining columns (e.g., all even-numbered columns) belong to the second set of pixels visible in the second viewing zone. In this way, both sets of pixels span substantially the full area of the display, by alternating columns, such that each viewer (player) perceives his view of the display as occupying substantially its full area. Any suitable technique may be used for constructing the display to make different sets of pixels visible in different viewing zones. In some embodiments, a lenticular lens may be used, as described further below. Other embodiments may use a parallax barrier, or any other suitable technique or device.

In some embodiments, a device such as a lenticular lens or parallax barrier may be used with the display of a wagering gaming apparatus (e.g., a casino game machine, or any other suitable device used for wagering gaming, such as a lottery terminal, a desktop computer, a laptop computer, a tablet computer, a smartphone, etc.) to make different sets of pixels of the display visible in different viewing zones, and each of the different sets of pixels may be used to present a different player view of a multi-player wagering game. For example, a first player occupying a first viewing zone may be presented a first-player view of the multi-player wagering game via a first set of pixels, and a second player occupying a second viewing zone may be presented a second-player view of the multi-player wagering game via a second set of pixels. In some embodiments, each player view may be a 2D view using a single set of pixels. In other embodiments, each player view may be a 3D view (e.g., an autostereoscopic 3D view) having a left-eye set of pixels and a right-eye set of pixels within the combined set of pixels visible to that player. Some embodiments may use a lenticular lens supporting at least a 90-degree angle of observation to produce multiple player views for a multi-player wagering game. In some embodiments, observation angles from the normal to the display screen to 45 degrees to the left of the normal may form a first-player viewing zone, while observation angles from the normal to 45 degrees to the right of the normal may form a second-player viewing zone.

In some embodiments, the different player views of a multi-player wagering game displayed via different sets of pixels in the display screen of a wagering gaming apparatus may be produced by different computers (e.g., different physical computers or different virtual machines) or different logic boxes. For example, in some embodiments, odd-numbered pixel columns of the wagering gaming apparatus's display may receive their output from one computer producing the first-player view of the multi-player wagering game, and even-numbered pixel columns may receive their output from another computer producing the second-player view of the multi-player wagering game. In some embodiments, the graphics output from different computers may be combined over a network and fed to the wagering gaming apparatus. As such, it should be appreciated that in some embodiments, the computers producing different player views may not be physically connected to each other or to the wagering gaming apparatus providing the display for the wagering game. In some embodiments, each computer or logic box may run its own random number generation process(es) to determine win/loss outcomes for the corresponding player in the multi-player wagering game.

The first-player view of the multi-player wagering game may be different from the second-player view. For example, in some embodiments, the first-player view may contain images and/or information not visible in the second-player view, and vice-versa. In some embodiments, the multi-player wagering game may engage the different players in competitive and/or cooperative game play via the differing player views, to determine outcomes of the wagering game. However, techniques described herein may also be used to provide independent game play to different players via the same display screen, without requiring any competitive and/or cooperative aspect to the game. For example, in some embodiments, the wagering game may be a reel-spinning game (e.g., slot machine game), and the different player views may allow each player to wager on and spin his own set of reels, using a common display screen, without being able to see the other player's reels at the same time. In some embodiments, one player's reels may have the same total set of symbols as another player's reels in the same multi-player game; however, this is not required.

In an example of a competitive multi-player reel-spinning wagering game, both players may simultaneously spin the same virtual reels having the same symbols, but each player may wager on different paylines and/or on different winning combinations of symbols, for instance. (Although examples of multi-player wagering games are described herein using the illustrative case having two players, it should be appreciated that many similar wagering games may allow for more than two players to play simultaneously using techniques described herein, e.g., by dividing the pixels of the display into more than two sets, projected into more than two viewing zones.) When a reel spin ends, although the same resulting symbols may be seen by both players on the reels, each player may have a different win/loss outcome based on the different paylines and/or symbols on which they placed wagers, and/or based on the amounts of the wagers. In some embodiments, while both players may see the same reels and symbols, each player's view may include a different animation showing that particular player's winning/losing paylines and/or symbols, and/or may include different information displayed, such as text informing that particular player of his win/loss outcome and/or amount; text, meters, etc., showing that particular player's total winnings/losses, account balance, etc., and/or any other suitable player-specific information and/or images.

In an example of a cooperative multi-player reel-spinning wagering game, each player may spin and be shown virtual reels having different symbols, and a goal of the multi-player game may be for both players together to complete a full set of symbols won by accumulating reel-spin wins involving those symbols, for instance. For example, each player's individual reels shown in that particular player's view may include only half of the full set of symbols, such that both players depend on each other's individual reel-spinning outcomes to collect the full set of won symbols and thereby achieve a jackpot, bonus round, or other desirable meta-outcome of the multi-player wagering game. It should be appreciated that the foregoing are merely some illustrative examples of possible cooperative and competitive multi-player reel-spinning wagering games presentable via a display that projects multiple different player views of the same screen area to multiple different players occupying different viewing zones, and many other examples of cooperative and competitive multi-player reel-spinning wagering games, as well as other types of multi-player wagering games, are possible and are intended to be within the scope of the inventive techniques described herein.

In an example of a non-competitive and non-cooperative multi-player reel-spinning wagering game, each player may be shown and may spin his own virtual reels, which may or may not have the same symbols as the other player's reels. In one example, the players may not be constrained to spin their reels simultaneously, but rather each player may independently spin his own reels whenever he decides to initiate a reel spin, regardless of the other player's timing in initiating reel spins.

In some embodiments, the wagering gaming apparatus may have a different set of input controls for receiving input from each player of a multi-player wagering game. For example, a first player occupying a first viewing zone to the left of the display screen's midline may use a first set of input controls located on the left-hand side of the wagering gaming apparatus, reachable by the first player from the first viewing zone. Similarly, a second player occupying a second viewing zone to the right of the display screen's midline may use a second set of input controls located on the right-hand side of the wagering gaming apparatus, reachable by the second player from the second viewing zone. Input received from the first player's set of input controls may control the first player's game play (e.g., for a reel-spinning game, placing wagers, designating paylines, initiating reel spins, etc.) as shown to the first player in the first player's viewing zone via the first player's set of pixels on the display screen. Input received from the second player's set of input controls may control the second player's game play as shown to the second player in the second player's viewing zone via the second player's set of pixels on the display screen. In some embodiments, the wagering gaming apparatus may have as many different sets of input controls as the number of players that can be simultaneously accommodated in playing multi-player wagering games on the wagering gaming apparatus.

In some embodiments, alternatively or additionally, the display of the wagering gaming apparatus may include a touchscreen interface, and both/all players of the multi-player wagering game may be enabled to provide control input to the wagering game via the same touchscreen interface. In some embodiments, the one or more processors of the wagering gaming apparatus may analyze touch input received via the touchscreen interface, and/or may analyze other accompanying data, and thereby determine which player provided each touch input. Touch input provided by the first player, for example, may be used to control the first player's game play in the multi-player wagering game, while touch input provided via the same touchscreen interface by the second player may be used to control the second player's game play in the multi-player wagering game. Touch input and/or other accompanying data may be analyzed to disambiguate which player was the source of the touch input in any suitable way. In one example, different players may be shown different virtual buttons in different portions of the display screen via their different player views projected to their different viewing zones, and touch input may be disambiguated by analyzing at which portion of the screen it was received. In another example, each player may be permitted to provide touch input on any portion of the display screen, and touch input may be disambiguated by detecting player movement via one or more sensors external to the display screen, and thereby determining which player moved to provide the touch input. Any suitable sensor(s) may be used to detect player movement. In one example, a sensor such as a ground plane sensor in a particular player's seat that is connected to or part of the wagering gaming apparatus may provide data indicating when the player raises at least some portion of his weight from the seat to provide input via the touchscreen. In another example, a handheld sensor may provide data indicating when a particular player is moving his hand to provide input via the touchscreen. It should be appreciated that the foregoing examples of movement detection sensors, as well as the foregoing examples of techniques for disambiguating different players' touch inputs, are provided merely for purposes of illustration, and other examples are possible. Some embodiments are not limited to any particular techniques, devices and/or configurations for enabling multi-player touch input via a same touchscreen.

In some embodiments, different sounds may be provided to different players playing a multi-player wagering game via the same wagering gaming apparatus. For example, in some embodiments, secret sounds such as sounds conveying information, alerts, hints, etc., intended for only one of two players in a multi-player wagering game may be made audible only in the viewing zone occupied by that player, and not in the viewing zone occupied by the other player. This may be accomplished in any suitable way. In some embodiments, one or more sound beaming devices may be used to play first-player secret sounds audible to the first player in the first viewing zone, and to play second-player secret sounds audible to the second player in the second viewing zone. In other embodiments, ultrasound, modulated speakers, and/or any other suitable device(s) and/or technique(s) may be used for making sounds audible in some zones and not others. The secret sounds for one player may not be audible in the viewing zone occupied by the other player. In some embodiments, a wagering game may also include common (non-secret) sounds that may be made audible to both players in both viewing zones.

In some embodiments, a multi-player wagering game may include rounds of a main game (e.g., a reel-spinning game) that may be interrupted by bonus rounds, which may be triggered in any of various known ways. In some embodiments, regardless of whether the main game rounds of the multi-player wagering game involve cooperative or competitive play or neither, one or more bonus rounds of the wagering game may involve cooperative and/or competitive game play. In some embodiments, a joint bonus round may be triggered for both players any time a bonus is triggered by either player. In other embodiments, certain events in the main game may trigger individual (single-player) bonus rounds, while other events may trigger joint bonus rounds.

Figure 14:
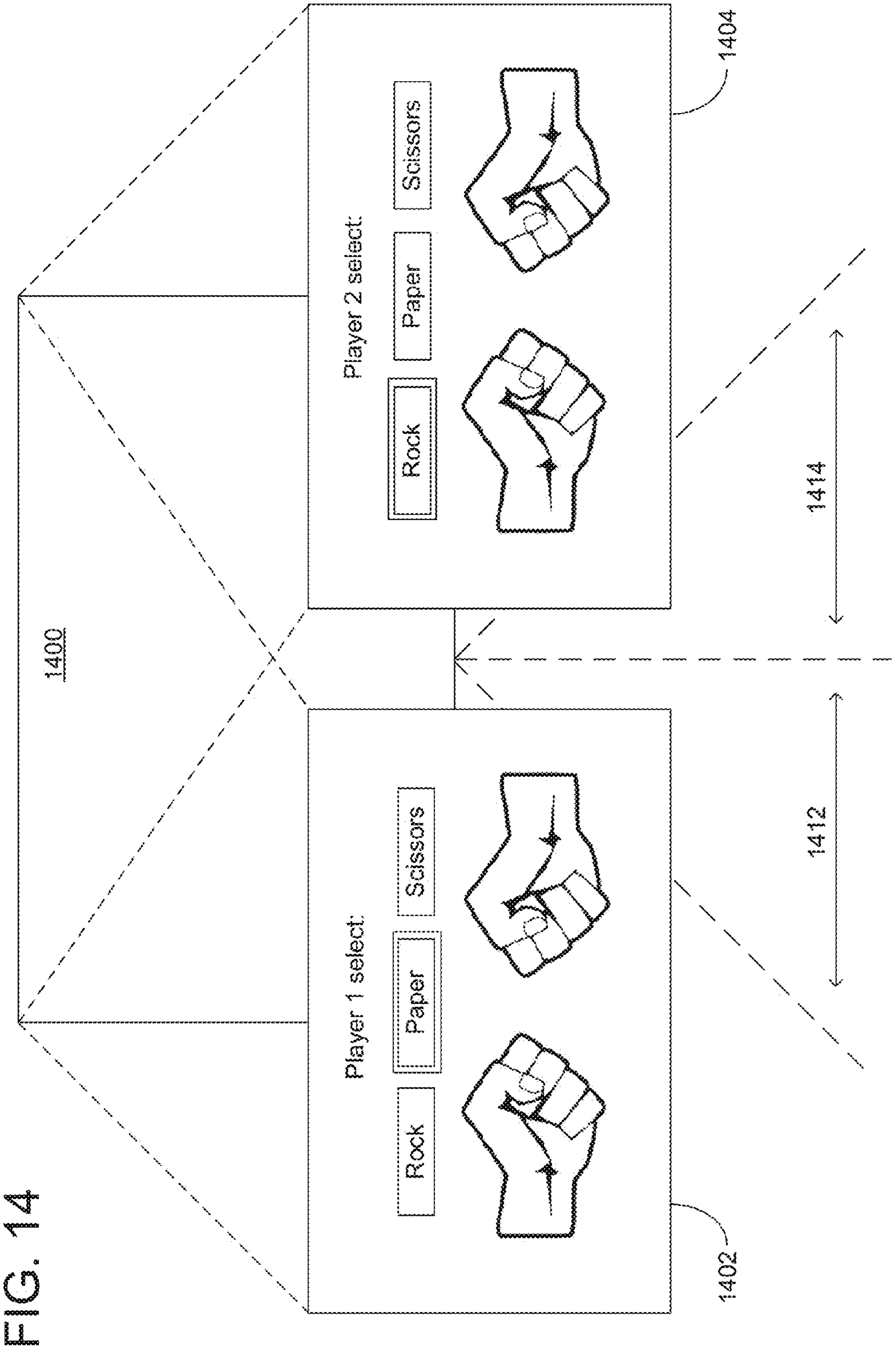
FIG. 14 illustrates an exemplary multi-player wagering game in accordance with some embodiments.

Any suitable type of bonus game may be configurable for multi-player competitive and/or cooperative play using display techniques described herein, and many examples are possible. For purposes of illustration, FIG. 14 depicts one particular example of a competitive rock-paper-scissors multi-player bonus game. (It should be appreciated that any bonus game design could alternatively be used as a stand-alone wagering game, without being limited to the context of a bonus game in a different main game.) In the embodiment shown in FIG. 14, pixels of display screen 1400 are apportioned to make first-player view 1402 of the multi-player rock-paper-scissors game visible in first viewing zone 1412, and second-player view 1404 visible in second viewing zone 1414. To the first player standing/sitting in first viewing zone 1412, it appears that first-player view 1402 (only) is displayed on the full area of display screen 1400, while to the second player occupying second viewing zone 1414, it appears that second-player view 1404 (only) is displayed on the full area of display screen 1400.

In this example rock-paper-scissors multi-player bonus game, both player views display a hand for each player, with the hand for player 1 on the left and the hand for player 2 on the right. When the game is played, the fingers of the hands will move to assume the positions of the "rock," "paper," or "scissors" selections that the players make, and the combination will determine a winner (the player showing "scissors" wins over the player showing "paper," etc.). In addition, each player is shown "rock," "paper," and "scissors" indicators showing which move that player has chosen for the next play. The player's next move may be selectable using any suitable input control method, and the player's selection may be displayed to that player by highlighting or otherwise visually distinguishing the indicator corresponding to the move the player has chosen. In the example shown in FIG. 14, player 1 has selected "paper" for the next move, and player 2 has selected "rock" for the next move. The indicators showing each player's chosen move for the next play may be visible to that player, but not to the other player, using the first-player and second-player views that are only visible in their own viewing zones. Thus, in the example in FIG. 14, each player staying in his own viewing zone cannot see what move the other player has chosen, and the players are unaware that player 1 will win the round (because "paper" beats "rock") until the round is executed and the animation involving the commonly displayed hands carries out the selected moves.

It should be appreciated that the foregoing is merely an example, and many other examples of competitive and/or cooperative wagering games are possible using the multi-player techniques described herein. For instance, in another example, a Battleship game may be provided, in which each player's view displays to that player the locations of only his own ships on a shared game board, with the locations of the other player's ships hidden. The players may take turns attempting to guess the locations of the other player's ships to "hit" and sink them to win the game. In another example game, one player may be shown an image that is not shown to the other player, and the player shown the image may have to describe the image to the other player so that the other player can guess what it is. In another example game, one player may be prompted to choose a prize from behind one of a set of closed doors displayed to that player, and the other player may be shown one or more hints to help the first player choose the best prize. In another example game, one player may be shown a puzzle to solve by making moves in the game, and the other player may be shown instructions to help the first player solve the puzzle. These and many other examples may be made possible using techniques described herein.

Figure 13:
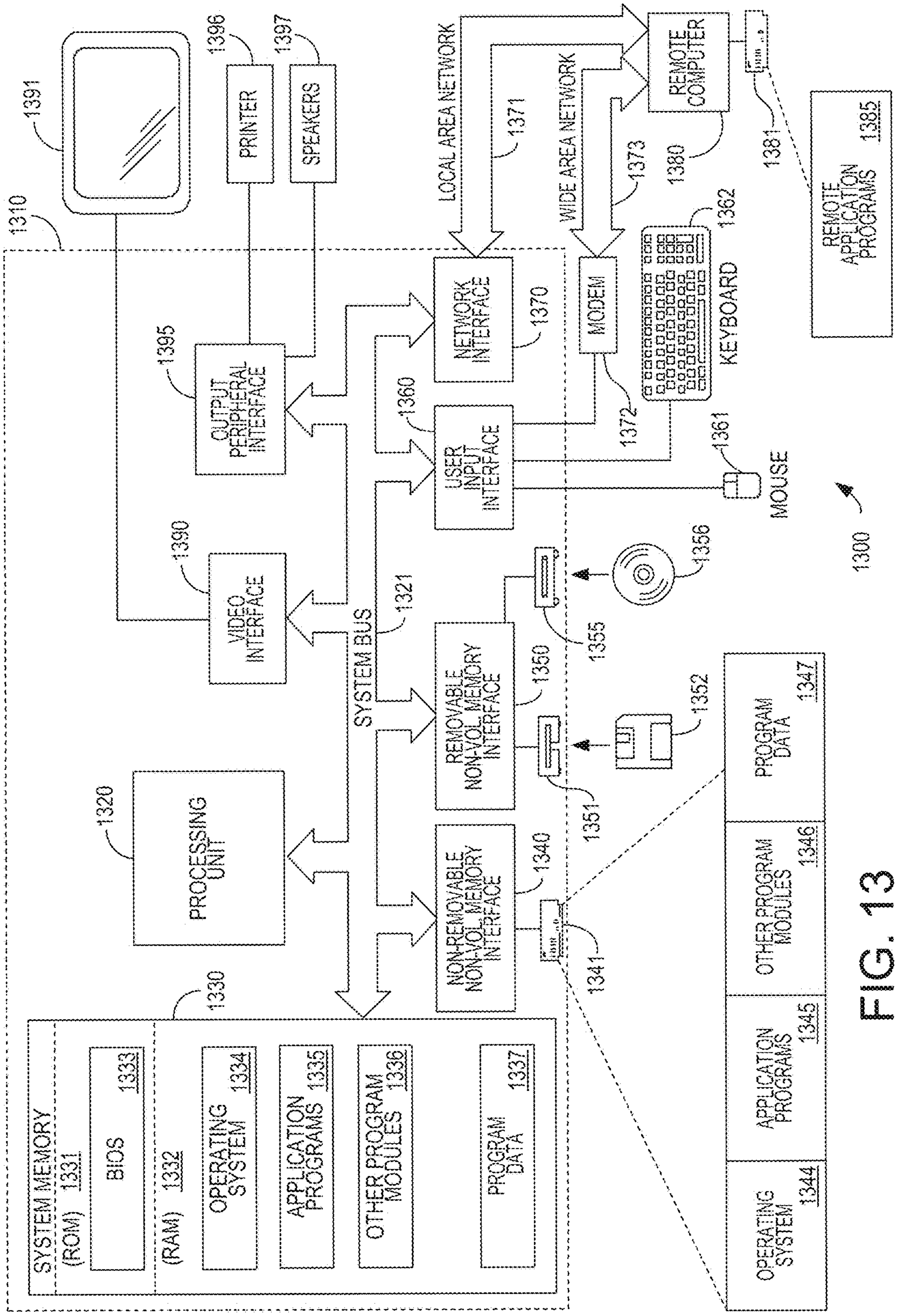
FIG. 13 is a block diagram of an exemplary computer system in which aspects of the present disclosure may be implemented, according to some embodiments.

FIG. 13 shows a block diagram of a computer system 1300 in which aspects of the present disclosure may be implemented, according to some embodiments. This computing system may be representative of a computing system suitable for implementing techniques described herein. In some embodiments, computer system 1300 may be configured to perform embodiments of method 600, method 700, method 800, and/or method 1000. In some embodiments, computer system 1300 may be configured to perform a method of generating 3D images and/or a method of controlling a 3D display device to display 3D images, and/or a method of providing multi-player wagering game play using techniques described herein. In some embodiments, computer system 1300 may be adapted to implement casino machine game 100 or components thereof.

However, it should be appreciated that computer system 1300 is only one example of a suitable computing environment and is not intended to suggest any limitation as to the scope of use or functionality of the described embodiments. Neither should computer system 1300 be interpreted as having any dependency or requirement relating to any one or combination of components illustrated in FIG. 13.

The embodiments are operational with numerous other computing system environments or configurations. Examples of well-known computing systems, environments, and/or configurations that may be suitable for use with the described techniques include, but are not limited to, personal computers, server computers, hand-held or laptop devices, smart phones, wearable computers, multiprocessor systems, microprocessor-based systems, set top boxes, programmable consumer electronics, network PCs, minicomputers, mainframe computers, distributed computing environments that include any of the above systems or devices, and the like.

The computer system may execute computer-executable instructions, such as program modules. Generally, program modules include routines, programs, objects, components, data structures, etc., that perform particular tasks or implement particular abstract data types. The embodiments may also be practiced in distributed computing environments where tasks are performed by remote processing devices that are linked through a communications network. In a distributed computing environment, program modules may be located in local and/or remote computer storage media including memory storage devices.

With reference to FIG. 13, an exemplary system 1300 for implementing the described techniques includes a computing device in the form of a computer 1310. Components of computer 1310 may include, but are not limited to, a processing unit 1320, a system memory 1330, and a system bus 1321 that couples various system components including the system memory to the processing unit 1320. The system bus 1321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1310 typically includes a variety of computer readable media. Computer readable media can be any available media that can be accessed by computer 1310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, solid state drives, or any other medium which can be used to store the desired information and which can accessed by computer 1310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1330 includes computer storage media in the form of volatile and/or nonvolatile memory such as read only memory (ROM) 1331 and random access memory (RAM) 1332. A basic input/output system 1333 (BIOS), containing the basic routines that help to transfer information between elements within computer 1310, such as during start-up, is typically stored in ROM 1331. RAM 1332 typically contains data and/or program modules that are immediately accessible to and/or presently being operated on by processing unit 1320. By way of example, and not limitation, FIG. 13 illustrates operating system 1334, application programs 1335, other program modules 1336, and program data 1337.

The computer 1310 may also include other removable/non-removable, volatile/nonvolatile computer storage media. By way of example only, FIG. 13 illustrates a hard disk drive 1341 that reads from and/or writes to non-removable, nonvolatile magnetic media, a magnetic disk drive 1351 that reads from and/or writes to a removable, nonvolatile magnetic disk 1352, and an optical disk drive 1355 that reads from and/or writes to a removable, nonvolatile optical disk 1356 such as a CD ROM or other optical media. Other removable/non-removable, volatile/nonvolatile computer storage media that can be used in the exemplary computer system include, but are not limited to, magnetic tape cassettes, flash memory cards, digital versatile disks, digital video tape, solid state RAM, solid state ROM, and the like. The hard disk drive 1341 is typically connected to the system bus 1321 through a non-removable memory interface such as interface 1340, and magnetic disk drive 1351 and optical disk drive 1355 are typically connected to the system bus 1321 by a removable memory interface, such as interface 1350.

The drives and their associated computer storage media discussed above and illustrated in FIG. 13 provide storage of computer readable instructions, data structures, program modules and other data for the computer 1310. In FIG. 13, for example, hard disk drive 1341 is illustrated as storing operating system 1344, application programs 1345, other program modules 1346, and program data 1347. Note that these components can either be the same as or different from operating system 1334, application programs 1335, other program modules 1336, and program data 1337. Operating system 1344, application programs 1345, other program modules 1346, and program data 1347 are given different numbers here to illustrate that, at a minimum, they are different copies. A user may enter commands and information into the computer 1310 through input devices such as a keyboard 1362 and pointing device 1361, commonly referred to as a mouse, trackball or touch pad. Other input devices (not shown) may include a microphone, joystick, game pad, satellite dish, scanner, touchscreen, or the like. These and other input devices are often connected to the processing unit 1320 through a user input interface 1360 that is coupled to the system bus, but may be connected by other interface and bus structures, such as a parallel port, game port or a universal serial bus (USB). A monitor 1391 or other type of display device is also connected to the system bus 1321 via an interface, such as a video interface 1390. In addition to the monitor, computers may also include other peripheral output devices such as speakers 1397 and printer 1396, which may be connected through an output peripheral interface 1395.

The computer 1310 may operate in a networked environment using logical connections to one or more remote computers, such as a remote computer 1380. The remote computer 1380 may be a personal computer, a server, a router, a network PC, a peer device or other common network node, and typically includes many or all of the elements described above relative to the computer 1310, although only a memory storage device 1381 has been illustrated in FIG. 13. The logical connections depicted in FIG. 13 include a local area network (LAN) 1371 and a wide area network (WAN) 1373, but may also include other networks. Such networking environments are commonplace in offices, enterprise-wide computer networks, intranets and the Internet.

When used in a LAN networking environment, the computer 1310 is connected to the LAN 1371 through a network interface or adapter 1370. When used in a WAN networking environment, the computer 1310 typically includes a modem 1372 or other means for establishing communications over the WAN 1373, such as the Internet. The modem 1372, which may be internal or external, may be connected to the system bus 1321 via the user input interface 1360, or other appropriate mechanism. In a networked environment, program modules depicted relative to the computer 1310, or portions thereof, may be stored in the remote memory storage device. By way of example, and not limitation, FIG. 13 illustrates remote application programs 1385 as residing on memory device 1381. It will be appreciated that the network connections shown are exemplary and other means of establishing a communications link between the computers may be used.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation comprises at least one processor-readable storage medium (i.e., at least one tangible, non-transitory processor-readable medium, e.g., a computer memory (e.g., hard drive, flash memory, processor working memory, etc.), a floppy disk, an optical disc, a magnetic tape, or other tangible, non-transitory processor-readable medium) encoded with a computer program (i.e., a plurality of instructions), which, when executed on one or more processors, performs at least the above-discussed functions. The processor-readable storage medium can be transportable such that the program stored thereon can be loaded onto any computer resource to implement functionality discussed herein. In addition, it should be appreciated that the reference to a computer program which, when executed, performs above-discussed functions, is not limited to an application program running on a host computer. Rather, the term "computer program" is used herein in a generic sense to reference any type of computer code (e.g., software or microcode) that can be employed to program one or more processors to implement above-discussed functionality.

In some embodiments, a method may include all the steps of method 600 or any suitable subset of one or more of the steps of method 600.

In some embodiments, a method may include all the steps of method 700 or any suitable subset of one or more of the steps of method 700 (e.g., steps 710-730).

Examples have been described in which the techniques described herein are used to generate a 3D virtual environment that models a main portion 400 of a reel-spinning machine, but embodiments are not limited in this regard. In some embodiments, the techniques may be used to model other portions of reel-spinning machine (e.g., other portions of the machine cabinet), other casino game machines, and/or any other suitable environment.

Examples have been described in which the techniques described herein are used to display stereoscopic images of a virtual 3D environment on a display of a cabinet housing a casino game machine, but embodiments are not limited in this regard. In some embodiments, the techniques may be used to display 3D (e.g., stereoscopic) images of a virtual 3D environment using any suitable display device, including, without limitation, a 3D TV, mobile display device, and/or a head-mounted display (HMD).

Examples have been described in which 3D images of a virtual reel-spinning machine are generated and displayed, but embodiments are not limited in this regard. In some embodiments, 3D images of physical, mechanical reel-spinning machine may be generated and displayed to a viewer. Through a user interface and a network connection to the remotely located, physical reel-spinning machine, the viewer may remotely control the operation of the physical reel-spinning machine, and may view live, real-time 3D images of the machine's operation.

The phraseology and terminology used herein is for the purpose of description and should not be regarded as limiting. The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described several embodiments, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A wagering gaming apparatus comprising:

a display comprising an array of pixels defining a full area of the display, the display being configured to make a first set of pixels spanning substantially the full area of the display visible in a first viewing zone occupied by a first player and not in a second viewing zone occupied by a second player, and to make a second set of pixels spanning substantially the full area of the display visible in the second viewing zone and not in the first viewing zone;

at least one processor;

at least one processor-readable storage medium storing processor-executable instructions that, when executed by the at least one processor, cause the at least one processor to execute a multi-player wagering game played by the first and second players on the wagering gaming apparatus, wherein executing the multi-player wagering game comprises displaying via the first set of pixels a first-player view of the multi-player wagering game visible to the first player in the first viewing zone and not to the second player in the second viewing zone, and displaying via the second set of pixels a second-player view of the multiplayer wagering game, different from the first-player view, and visible to the second player in the second viewing zone and not to the first player in the first viewing zone; and a first-player set of input controls in a first location on the wagering gaming apparatus reachable by the first player from the first viewing zone and a second-player set of input controls in a second location on the wagering gaming apparatus reachable by the second player from the second viewing zone, wherein the processor-executable instructions further cause the at least one processor to:

receive first-player input controlling the first player's game play in the multi-player wagering game from the first player via the first-player set of input controls; and receive second-player input controlling the second player's game play in the multiplayer wagering game from the second player via the second-player set of input controls.

2. The wagering gaming apparatus of claim 1, wherein the display comprises a lenticular lens making the first set of pixels visible in the first viewing zone and not in the second viewing zone, and the second set of pixels visible in the second viewing zone and not in the first viewing zone.

3. A wagering gaming apparatus comprising:

a display comprising an array of pixels defining a full area of the display, the display being configured to make a first set of pixels spanning substantially the full area of the display visible in a first viewing zone occupied by a first player and not in a second viewing zone occupied by a second player, and to make a second set of pixels spanning substantially the full area of the display visible in the second viewing zone and not in the first viewing zone;

at least one processor;

at least one processor-readable storage medium storing processor-executable instructions that, when executed by the at least one processor, cause the at least one processor to execute a multi-player wagering game played by the first and second players on the wagering gaming apparatus, wherein executing the multi-player wagering game comprises displaying via the first set of pixels a first-player view of the multi-player wagering game visible to the first player in the first viewing zone and not to the second player in the second viewing zone, and displaying via the second set of pixels a second-player view of the multiplayer wagering game, different from the first-player view, and visible to the second player in the second viewing zone and not to the first player in the first viewing zone; and at least one sound beaming device configured to make first-player secret sounds audible in the first viewing zone and not in the second viewing zone, and to make second-player secret sounds audible in the second viewing zone and not in the first viewing zone, wherein executing the multi-player wagering game comprises playing via the at least one sound beaming device first-player secret sounds of the multi-player wagering game audible to the first player in the first viewing zone and not to the second player in the second viewing zone, and playing via the at least one sound beaming device second-player secret sounds of the multi-player wagering game audible to the second player in the second viewing zone and not to the first player in the first viewing zone.

4. The wagering gaming apparatus of claim 1, wherein the display comprises a touchscreen interface, wherein the processor-executable instructions further cause the at least one processor to:

receive first-player input controlling the first player's game play in the multi-player wagering game from the first player via the touchscreen interface; and receive second-player input controlling the second player's game play in the multiplayer wagering game from the second player via the same touchscreen interface.

5. The wagering gaming apparatus of claim 1, wherein the first-player view of the multi-player wagering game displayed in the first viewing zone comprises an autostereoscopic 3D first-player view, and wherein the second-player view of the multi-player wagering game displayed in the second viewing zone comprises an autostereoscopic 3D second-player view different from the autostereoscopic 3D first-player view.

6. The wagering gaming apparatus of claim 1, wherein the multi-player wagering game comprises a multi-player reel-spinning game.

7. A method of providing multi-player wagering game play on a wagering gaming apparatus having a display comprising: an array of pixels defining a full area of the display, the display being configured to make a first set of pixels spanning substantially the full area of the display visible in a first viewing zone occupied by a first player and not in a second viewing zone occupied by a second player, and to make a second set of pixels spanning substantially the full area of the display visible in the second viewing zone and not in the first viewing zone; and at least one sound beaming device configured to make first-player secret sounds audible in the first viewing zone and not in the second viewing zone, and to make second-player secret sounds audible in the second viewing zone and not in the first viewing zone, the method comprising:

engaging the first player and the second player in playing a multi-player wagering game on the wagering gaming apparatus;

displaying via the first set of pixels in the display a first-player view of the multi-player wagering game visible to the first player in the first viewing zone and not to the second player in the second viewing zone;

displaying via the second set of pixels in the display a second-player view of the multi-player wagering game, different from the first-player view, and visible to the second player in the second viewing zone and not to the first player in the first viewing zone;

playing, via the at least one sound beaming device, first-player secret sounds of the multi-player wagering game audible to the first player in the first viewing zone and not to the second player in the second viewing zone; and playing, via the at least one sound beaming device, second-player secret sounds of the multi-player wagering game audible to the second player in the second viewing zone and not to the first player in the first viewing zone.

8. The method of claim 7, wherein the display comprises a lenticular lens making the first set of pixels visible in the first viewing zone and not in the second viewing zone, and the second set of pixels visible in the second viewing zone and not in the first viewing zone.

9. The method of claim 7, wherein the wagering gaming apparatus further comprises a first-player set of input controls in a first location on the wagering gaming apparatus reachable by the first player from the first viewing zone and a second-player set of input controls in a second location on the wagering gaming apparatus reachable by the second player from the second viewing zone, and wherein the method further comprises:

receiving first-player input controlling the first player's game play in the multi-player wagering game from the first player via the first-player set of input controls; and receiving second-player input controlling the second player's game play in the multiplayer wagering game from the second player via the second-player set of input controls.

10. The method of claim 7, wherein the display comprises a touchscreen interface, and wherein the method further comprises:

receiving first-player input controlling the first player's game play in the multi-player wagering game from the first player via the touchscreen interface; and receiving second-player input controlling the second player's game play in the multiplayer wagering game from the second player via the same touchscreen interface.

11. The method of claim 7, wherein the first-player view of the multi-player wagering game displayed in the first viewing zone comprises an autostereoscopic 3D first-player view, and wherein the second-player view of the multi-player wagering game displayed in the second viewing zone comprises an autostereoscopic 3D second-player view different from the autostereoscopic 3D first-player view.

12. The method of claim 7, wherein the multi-player wagering game comprises a multi-player reel-spinning game.

13. At least one non-transitory processor-readable storage medium storing processor-executable instructions that, when executed, perform a method of providing multi-player wagering game play on a wagering gaming apparatus having a display comprising an array of pixels defining a full area of the display, the display being configured to make a first set of pixels spanning substantially the full area of the display visible in a first viewing zone occupied by a first player and not in a second viewing zone occupied by a second player, and to make a second set of pixels spanning substantially the full area of the display visible in the second viewing zone and not in the first viewing zone, and at least one sound beaming device configured to make first-player secret sounds audible in the first viewing zone and not in the second viewing zone, the method comprising:

engaging the first player and the second player in playing a multi-player wagering game on the wagering gaming apparatus;

displaying via the first set of pixels in the display a first-player view of the multi-player wagering game visible to the first player in the first viewing zone and not to the second player in the second viewing zone;

displaying via the second set of pixels in the display a second-player view of the multi-player wagering game, different from the first-player view, and visible to the second player in the second viewing zone and not to the first player in the first viewing zone; and playing, via the at least one sound beaming device, first-player secret sounds of the multi-player wagering game audible to the first player in the first viewing zone and not to the second player in the second viewing zone.

14. The at least one non-transitory processor-readable storage medium of claim 13, wherein the display comprises a lenticular lens making the first set of pixels visible in the first viewing zone and not in the second viewing zone, and the second set of pixels visible in the second viewing zone and not in the first viewing zone.

15. The at least one non-transitory processor-readable storage medium of claim 13, wherein the at least one sound beaming device is further configured to make second-player secret sounds audible in the second viewing zone and not in the first viewing zone, and wherein the method further comprises playing, via the at least one sound beaming device, second-player secret sounds of the multi-player wagering game audible to the second player in the second viewing zone and not to the first player in the first viewing zone.

16. The at least one non-transitory processor-readable storage medium of claim 13, wherein the wagering gaming apparatus further comprises a first-player set of input controls in a first location on the wagering gaming apparatus reachable by the first player from the first viewing zone and a second-player set of input controls in a second location on the wagering gaming apparatus reachable by the second player from the second viewing zone, and wherein the method further comprises:

receiving first-player input controlling the first player's game play in the multi-player wagering game from the first player via the first-player set of input controls; and receiving second-player input controlling the second player's game play in the multiplayer wagering game from the second player via the second-player set of input controls.

17. The at least one non-transitory processor-readable storage medium of claim 13, wherein the display comprises a touchscreen interface, and wherein the method further comprises:

receiving first-player input controlling the first player's game play in the multi-player wagering game from the first player via the touchscreen interface; and receiving second-player input controlling the second player's game play in the multiplayer wagering game from the second player via the same touchscreen interface.

18. The at least one non-transitory processor-readable storage medium of claim 13, wherein the first-player view of the multi-player wagering game displayed in the first viewing zone comprises an autostereoscopic 3D first-player view, and wherein the second-player view of the multi-player wagering game displayed in the second viewing zone comprises an autostereoscopic 3D second-player view different from the autostereoscopic 3D first-player view.

19. The at least one non-transitory processor-readable storage medium of claim 13, wherein the multi-player wagering game comprises a multi-player reel-spinning game.

* * * * *